United States Patent
Nikipelov et al.

(10) Patent No.: US 12,055,478 B2
(45) Date of Patent: Aug. 6, 2024

(54) APPARATUS AND METHOD FOR CLEANING AN INSPECTION SYSTEM

(71) Applicant: ASML NETHERLANDS B.V., Veldhoven (NL)

(72) Inventors: Andrey Nikipelov, Eindhoven (NL); Saeedeh Farokhipoor, Eindhoven (NL); Maarten Van Kampen, Eindhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 275 days.

(21) Appl. No.: 17/563,867

(22) Filed: Dec. 28, 2021

(65) Prior Publication Data

US 2022/0205900 A1    Jun. 30, 2022

Related U.S. Application Data

(60) Provisional application No. 63/132,249, filed on Dec. 30, 2020.

(51) Int. Cl.
  *G01N 21/15*    (2006.01)
  *G01N 21/88*    (2006.01)
  (Continued)

(52) U.S. Cl.
  CPC ......... *G01N 21/15* (2013.01); *G01N 21/8806* (2013.01); *G01N 21/9501* (2013.01); *G02B 1/18* (2015.01); *G02B 5/0891* (2013.01)

(58) Field of Classification Search
  CPC ....... G01N 21/15; G01N 21/8806; G02B 1/18
  See application file for complete search history.

(56) References Cited

U.S. PATENT DOCUMENTS 5,433,988 A  *  7/1995  Fukuda ................... B32B 15/08
                                                        359/359
7,351,980 B2     4/2008  Lange
                         (Continued)

FOREIGN PATENT DOCUMENTS

WO        2020/115086        6/2020

OTHER PUBLICATIONS

Barnes, B.M.: "Assessing the wavelength extensibility of optical patterned defect inspection", Proc. of SPIE, vol. 10145 (Mar. 30, 2017).

(Continued)

*Primary Examiner* — Hugh Maupin
(74) *Attorney, Agent, or Firm* — Pillsbury Winthrop Shaw Pittman, LLP

(57) ABSTRACT

A method and apparatus for cleaning vacuum ultraviolet (VUV) optics (e.g., one or more mirrors of a VUV) of a substrate inspection system is disclosed. The cleaning system ionizes or disassociates hydrogen gas in a VUV optics environment to generate hydrogen radicals (e.g., H*) or ions (e.g., $H^+$, $H_2^+$, $H_3^+$, which remove water or hydrocarbons from the surface of the one or more mirrors. The one or more VUV mirrors may include a reflective material, such as aluminum. The one or more VUV mirrors may have a protective coating to protect the reflective material from any detrimental reaction to the hydrogen radicals or ions. The protective coating may include a noble metal.

20 Claims, 12 Drawing Sheets

(51) Int. Cl.
*G01N 21/95* (2006.01)
*G02B 1/18* (2015.01)
*G02B 5/08* (2006.01)

(56) References Cited

U.S. PATENT DOCUMENTS

| | | | |
|---|---|---|---|
| 8,575,576 B2 | 11/2013 | Solarz et al. | |
| 8,916,831 B2 | 12/2014 | Wang | |
| 9,188,544 B2 | 11/2015 | Delgado | |
| 9,448,343 B2 | 9/2016 | Kvamme et al. | |
| 9,453,801 B2 | 9/2016 | Wang et al. | |
| 9,558,858 B2 | 1/2017 | Shortt et al. | |
| 9,804,309 B1 | 10/2017 | Lehan | |
| 10,139,283 B2 | 11/2018 | Shchemelinin et al. | |
| 10,309,907 B2 | 6/2019 | Zhang et al. | |
| 2006/0033984 A1* | 2/2006 | Bruynooghe | G02B 7/025 |
| | | | 359/350 |
| 2014/0167612 A1* | 6/2014 | Perelman | H01J 61/526 |
| | | | 315/111.21 |
| 2014/0261568 A1 | 9/2014 | Delgado et al. | |
| 2016/0246179 A1* | 8/2016 | Huber | G03F 7/702 |
| 2016/0377988 A1* | 12/2016 | Paul | G02B 27/005 |
| | | | 359/355 |
| 2018/0039001 A1* | 2/2018 | Gonchar | G02B 5/0816 |
| 2020/0064748 A1* | 2/2020 | Forcht | G02B 27/0006 |
| 2020/0355621 A1* | 11/2020 | Chuang | G02B 21/0016 |
| 2021/0293998 A1* | 9/2021 | Shklover | G03F 7/70925 |
| 2022/0373723 A1* | 11/2022 | Forcht | G02B 5/0891 |

OTHER PUBLICATIONS

Wells, K. et al.: "Extending Optical Inspection to the VUV," 2017 International Conference on Frontiers of Characterization and Metrology for Nanoelectronics, D.G. Seiler, ed., pp. 92-101, NIST (2017).
Office Action issued in corresponding Taiwanese Patent Application No. 110149294, dated Feb. 13, 2023.

* cited by examiner

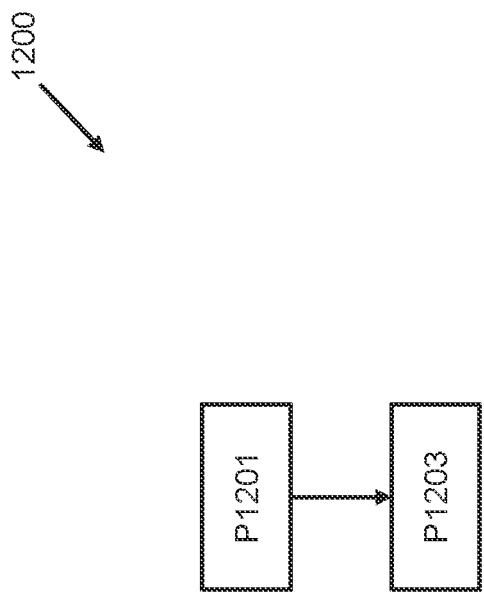

APPARATUS AND METHOD FOR CLEANING AN INSPECTION SYSTEM

This application claims the benefit of priority to U.S. provisional patent application No. 63/132,249, filed on Dec. 30, 2020, which is incorporated herein in its entirety by reference.

TECHNICAL FIELD

This disclosure relates to substrate inspection, and, for example, vacuum ultraviolet inspection systems.

BACKGROUND

In manufacturing processes of integrated circuits (ICs), unfinished or finished circuit components are inspected to ensure that they are manufactured according to design and are free of defects. Due to the large scale of circuit integration and the decreasing size of semiconductor devices, the reticles and fabricated devices have become increasingly sensitive to defects. That is, defects which cause faults in the device are becoming increasingly smaller. The device can generally be required to be fault free prior to shipment to the end users or customers. As the physical sizes of IC components continue to shrink, accuracy and yield in defect detection become more important.

Inspection systems utilizing charged particle (e.g., electron beam) microscopes, such as a scanning electron microscope (SEM) can be employed. While e-beam inspection systems can find the smallest defects, the yield may be slow. Optical inspection systems, such as deep ultraviolet (DUV) or vacuum ultraviolet (VUV) inspection systems, are faster, but their resolution is limited. Building or managing optical inspection systems to detect defects with high resolution may be challenging, especially with shrinking sizes of the design rules.

SUMMARY

Optical inspection systems implemented using VUV (e.g., with a wavelength of 10-200 nm) may be used for inspection at high resolution (e.g., 7 nm, 5 nm, 3 nm, or other resolutions). Delivering inspection capabilities within this range of wavelengths increases resolution of the optical systems and obtains good contrast for metrology images of substrates with several semi-opaque, semiconducting or insulating layers. With VUV, one can realize through-layer inspection tools for optical overlay measurement. However, building such an inspection system has many challenges with respect to a technology (e.g., optics, coatings, radiation sources, sensors or other components) used in the VUV inspection system. The challenge is not only to enable the technology, but to combine them to enable inspection rates that make the technology cost effective for monitoring in production.

For example, mirrors used in VUV inspection systems, are found to degrade quickly. In VUV inspection systems, typically aluminum based mirrors (e.g., mirrors that use aluminum as reflective material) are used since aluminum has a reflectance of more than 80% across VUV wavelengths. Other materials may cause significant losses after several reflections (e.g., 4-6 mirrors may be needed to form a proper illumination spot, guiding and shaping radiation from the source to the substrate). VUV is readily absorbed by gases, so any environment comprising VUV mirrors is generally kept under low pressure (P<10 mbar), and to further reduce losses or mirror degradation by reaction with molecular gases activated by VUV absorption, the gasses used may typically be noble gases. Despite being in relatively clean environment (e.g., noble gas at low pressure, with some flow for maintaining even lower pressure of contaminants), it is found that aluminum-based mirrors degrade quickly when subject to VUV power densities. This would render them useless in a production scenario (e.g., where inspection is performed for continuous periods such as 24/7), relevant for the application (e.g., Q~1 . . . 100 mW/cm$^2$). This problem has to be addressed if high throughputs are expected from such inspection systems. These and other drawbacks exist.

There is a continuing need for improved inspection systems and, in particular, at a very low wavelength, such as VUV.

In embodiments, there is provided a method for cleaning vacuum ultraviolet (VUV) optics of an inspection system. The method includes: supplying hydrogen gas (e.g., pure gas or a mix with a noble gas) to an environment of VUV optics in the inspection system, wherein the VUV optics includes one or more VUV mirrors, the one or more VUV mirrors coated with a protective coating comprising a noble metal; and causing ionization and/or dissociation of the hydrogen gas to generate hydrogen ions or radicals, wherein the hydrogen ions or radicals clean the VUV optics.

In embodiments, there is provided an inspection system. The inspection system includes: one or more VUV mirrors that are configured to guide VUV from a VUV source to a substrate in the inspection system, wherein the one or more VUV mirrors are coated with a protective coating comprising a noble metal; and an ionizer configured to ionize hydrogen gas supplied to an environment of the one or more VUV mirrors to generate hydrogen ions or radicals for cleaning the one or more VUV mirrors.

In embodiments, there is provided a VUV mirror in an inspection system. The VUV mirror includes a reflective material on the VUV mirror, the reflective material comprising aluminum; a protective coating to protect the reflective material, wherein the protective coating contains a noble metal; and an adhesion layer that acts as an intermediate layer between the reflective material and the protective coating, the adhesion layer configured to adhere the protective coating to the reflective material and prevent mixing of the protective coating with aluminum.

Other advantages of the embodiments of the present disclosure will become apparent from the following description taken in conjunction with the accompanying drawings wherein are set forth, by way of illustration and example, certain embodiments of the present invention.

BRIEF DESCRIPTION OF FIGURES

FIG. 12 is a flow diagram of a process for ionizing and generating radicals from hydrogen gas using laser-based ionizer, in accordance with one or more embodiments.

DETAILED DESCRIPTION

Figure 1:
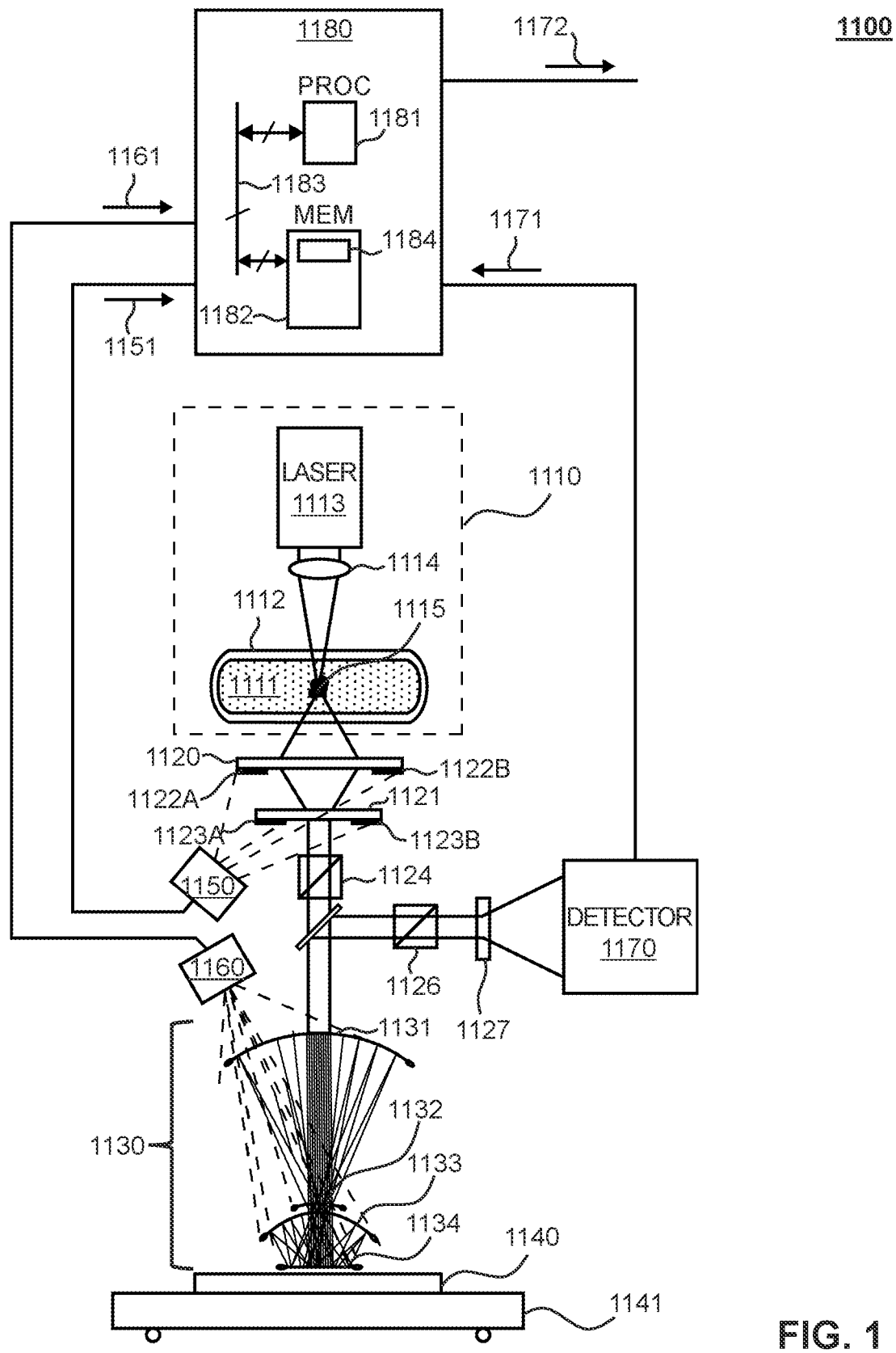
FIG. 1 illustrates an optical measurement system for measuring characteristics of a specimen that includes IR based thermal imaging of optical elements with low IR emissivity.

Electronic devices are constructed of circuits formed on a piece of silicon called a wafer or more generally a substrate. Many circuits may be formed together on the same piece of silicon and are called integrated circuits or ICs. One component of improving yield in manufacturing of the IC chips is monitoring the chip making process to help ensure that it is producing a sufficient number of functional integrated circuits. One way to monitor the process is to inspect the chip circuit structures at various stages of their formation. Inspection can be carried out using optical inspection systems, e.g., vacuum ultraviolet (VUV) based inspection system. The image or other optical information (such as distribution of diffracted orders) can be used to determine if the structure was formed properly and also if it was formed in the proper location. If the structure is defective or location is shifted with respect to optimum, then the process can be adjusted so the defect is less likely to recur.

In VUV inspection systems, typically one or more aluminum based mirrors (e.g., mirrors that use aluminum as a reflective material) are used since aluminum has a reflectance of more than 80% across VUV wavelengths. However, such a mirror is found to degrade quickly. The reflectivity degradation of such a mirror may be due to "poisoning" of the reflecting layer, which may occur due to one or more reasons. For example, any material deposited as a coating on top of aluminum and comprising ionic or covalent bonds, under the VUV irradiation, may start to intermix, react with aluminum. Energy of photons of VUV (e.g., 50 . . . 5 eV) may be greater than the energy of the covalent or ionic bonds, which may cause the above reaction and may degrade the mirror over time. Moreover, the excitation following VUV photon absorption may be sufficient to displace individual atoms in the process of chemical bond breaking. In another example, the VUV photon energy may cause photo-induced (or photo-effect-electron induced) dissociation of any adsorbed molecule at the surface of the mirror. The optics environment in the VUV inspection system may contain water vapor ($H_2O$) or hydrocarbons (CxHy or CxHyOz, possibly with other trace elements (N, P . . . )), albeit at small concentration. They first get adsorbed at the surface, then dissociate and later "dissolve" as carbon (C), oxygen (O), or hydrogen (H) into the mirror, finally react with individual aluminum atoms and introduce defects that in turn reduce reflectivity.

A mirror may have one or more protective coatings (e.g., calcium fluoride—$CaF_2$ or magnesium fluoride—MgF), but even they seem fail to protect an aluminum mirror as it is observed that the reflectivity of such a mirror degrades quickly in VUV. The one or more coatings may also fail due to poisoning effect. For example, the fluoride coating partially dissociates, and then the fluoride element may start to mix into the bulk of aluminum, while residual partial fluoride has far greater absorbance due to unsaturated chemical bonds/defects. These and other drawbacks exist.

Embodiments of the present disclosure discuss a VUV inspection system having a cleaning system for cleaning VUV optics (e.g., one or more mirrors of the VUV inspection system), thereby improving longevity of the VUV optics and consequently, the inspection throughput of the VUV inspection system. The cleaning system uses hydrogen gas (e.g., as pure gas or a mix of hydrogen gas and noble gas) to clean the VUV optics by removing water or hydrocarbons from the surface of the one or more mirrors. The cleaning system ionizes or dissociates the hydrogen gas in a VUV optics environment to generate active hydrogen species, such as radicals (e.g., $H^*$) or ions (e.g., $H^+, H_2^+, H_3^+$), which reduce oxides or carbides, remove water or hydrocarbons and other species volatile in combination with hydrogen from the surface of the one or more mirrors. The VUV mirror may comprise a reflective material, such as aluminum (e.g., as a reflective layer or be made of aluminum). The VUV mirror may have a protective coating to protect the reflective material from detrimental reaction to the hydrogen radicals or ions. In embodiments, the protective coating comprises a noble metal (e.g., ruthenium (Ru), rhodium (Rh), silver (Ag), gold (Au), platinum (Pt), iridium (Ir), osmium (Os) or other metal). In embodiments, an intermediate layer (also referred to as an "adhesion layer") may be used to promote adhesion of the protective coating with the reflective material or prevent the mixing of the noble metal with the reflective material. The ionization or dissociation of hydrogen gas may be achieved using one or more various sources, such as electron beam, plasma source, laser induced spark, hydrogen radical generator (HRG), or other source. Further, a portion of the VUV inspection system (e.g., one or more interior walls of the VUV inspection system proximate the VUV optics) may be coated with hydrogen-induced outgassing (HIO)-incapable coating to prevent hydrogen-induced outgassing from those portions. The HIO-incapable coating may comprise a refractory metal (e.g., molybdenum (Mo), tungsten (W)), or other metal (e.g., Cr or NiP).

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims. For example, although embodiments are described in the context of utilizing VUV, the disclosure is not so limited. Other types of wavelengths may be similarly applied. Furthermore, other imaging systems may be used, such as photo detection, x-ray detection, etc.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display, or organic light-emitting diode (OLED) or microLED panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g., with a wavelength of 365, 248, 193, 157 or 126 nm), EUV (extreme ultra-violet radiation, e.g., having a wavelength in the range 5-20 nm) and VUV (e.g., having a wavelength in the range 10-200 nm).

Reference is now made to FIG. 1, which illustrates an optical measurement system 1100 for measuring characteristics of a specimen and that includes IR based thermal imaging of one or more optical elements with low IR emissivity. System 1100 may be used to perform optical scatterometry measurements of a specimen 1140 disposed on a specimen positioning system 1141.

System 1100 includes a laser sustained plasma (LSP) illumination source 1110 to generate illumination radiation. In embodiments, the LSP illumination source 1110 is configured to generate various wavelengths, including VUV. LSP illumination sources are capable of producing high-power and high-brightness broadband radiation suitable for metrology and inspection applications. LSP illumination source 1110 includes a laser 1113 and focusing optics 1114 that focus laser radiation into a working gas 1111 contained by a transparent bulb 1112. The laser radiation excites the gas 1111 into a plasma state that emits radiation. This effect is typically referred to as "pumping" the plasma with the laser radiation. The plasma bulb 1112 is configured to contain the working gas species as well as the generated plasma 1115. In embodiments, LSP illumination source 1110 is maintained with an infrared laser pump having a beam power on the order of several kilowatts. The laser beam is focused into a volume of a low or medium pressure working gas 1111 contained by plasma bulb 1112. The absorption of laser power by the plasma generates and sustains the plasma, for example, at plasma temperatures above 10,000 Kelvin.

In the illustrated embodiment, plasma bulb 1112 includes a cylindrical shape with spherical ends. In embodiments, plasma bulb 1112 includes any of a substantially spherical shape, a substantially cylindrical shape, a substantially ellipsoidal shape, or a substantially prolate spheroid shape. These shapes are provided by way of non-limiting example. However, many other shapes may be contemplated. Plasma bulb 1112 is substantially transparent to at least a portion of the laser pump radiation and is also substantially transparent to at least a portion of the collectable illumination (e.g., IR radiation, visible light, ultraviolet radiation) emitted by the plasma 1115 sustained within the plasma bulb 1112.

It is contemplated herein that a refillable plasma bulb 1112 may be utilized to sustain a plasma in a variety of gas environments. In one embodiment, the working gas 1111 of the plasma bulb 1112 may include an inert gas (e.g., noble gas or non-noble gas) or a non-inert gas (e.g., mercury) or their mixtures. In general, the plasma bulb 1112 may be filled with any gas known in the art suitable for use in laser sustained plasma radiation sources. In addition, the working gas may include a mixture of two or more gases. By way of non-limiting example, the working gas may include any one or combination of Ar, Kr, Xe, He, Ne, $N_2$, $Br_2$, $Cl_2$, $I_2$, $H_2O$, $O_2$, $H_2$, $CH_4$, NO, $NO_2$, $CH_3OH$, $C_2H_5OH$, $CO_2$, $NH_3$ one or more metal halides, a Ne/Xe mixture, an Ar/Xe mixture, a Kr/Xe mixture, an Ar/Kr/Xe mixture, an ArHg mixture, a KrHg mixture, and a XeHg mixture. In general, the embodiments herein should be interpreted to extend to any radiation pumped plasma generating system and should further be interpreted to extend to any type of working gas suitable for sustaining a plasma within a plasma bulb.

Beam shaping optics 1120 and 1121 shape and direct incident illumination radiation through polarizer 1124. In the depicted embodiment, beam shaping optics 1120 and 1121 collimate the illumination radiation generated by the LSP illumination source 1110. In embodiments, beam shaping optics 1120 and 1121 include one or more collimating mirrors, one or more apertures, one or more monochromators, one or more beam stops, one or more multilayer optics, one or more refractive optics, one or more diffractive optics such as one or more zone plates, or any combination thereof.

In the depicted embodiment, the collimated illumination radiation passes through polarizer 1124. In embodiments, polarizer 1124 is configured to selectively rotate a polarizing element about the optical axis of the illumination radiation beam. In general, polarizer 1124 may include any polarizing element and system to rotate the polarizing element known in the art. For example, the polarizer 1124 may include a polarizing element mechanically coupled to a rotational actuator. In one example, the polarizing element may be a Rochon prism. In another example, the polarizing element may include a beam displacer. Polarizer 1124 is configured to operate within system 1100 in either a rotationally active or rotationally inactive state. In one instance, a rotational actuator of polarizer 1124 may be inactive such that the polarizing element remains rotationally fixed about the optical axis of the illumination radiation beam. In another instance, the rotational actuator may rotate the polarizing element at a selected angular frequency, ωp, about the optical axis of the illumination radiation. In some other embodiments, polarizer 1124 is configured with a fixed polarization angle about the optical axis of the illumination radiation beam.

As depicted in FIG. 1, polarizer 1124 generates a polarized radiation beam directed toward a beamsplitter. The beamsplitter directs the polarized radiation beam towards objective 1130. In the example of FIG. 1, objective 1130 is arranged in a four mirror, four pass configuration including reflective optical elements only. Objective 1130 includes mirrors 1131-1134 that focus the illumination radiation (i.e., the primary measurement radiation) onto the surface of substrate 1140. The illumination radiation is focused onto the surface of substrate 1140 over a range of angles of incidence. The interaction of the focused, polarized illumination radiation with substrate 1140 modifies the polarization of the radiation by any of reflection, scattering, diffraction, transmission, or other types of processes. After interaction with the substrate 1140, the modified radiation is collected by objective 1130 and directed to the beamsplitter. The beamsplitter is configured to transmit the modified radiation toward polarizer 1126. In the embodiment depicted in FIG. 1, polarizer 1126 includes a polarizer element that remains rotationally fixed about the optical axis of the modified radiation beam as the beam passes through the polarizer 1126 to dispersion element 1127 and detector 1170 of a spectrometer. In the spectrometer, the beam components having different wavelengths are refracted (e.g., in a prism spectrometer) or diffracted (e.g., in a grating spectrometer) in different directions to one or more detector elements of detector 1170. The detectors may be a linear array of photodiodes, with each photodiode measuring radiation in a different wavelength range. The radiation received by the spectrometer is analyzed with regard to polarization state, allowing for spectral analysis by the spectrometer of radiation passed by the polarizer 1126. The detected spectra 1171 are passed to computing system 1180 for analysis of the structural characteristics of specimen 1140.

Detector 1170 collects radiation from substrate 1140 and generates output signals 1171 indicative of properties of specimen 1140 that are sensitive to the incident illumination radiation. Detector 1170 is able to resolve one or more photon energies and produces signals for each energy component indicative of one or more properties of the specimen. In embodiments, the detector 1170 includes any of a CCD array, a photodiode array, a CMOS detector, and/or a photomultiplier tube. In embodiments, detector 1170 is a wavelength dispersive detector, for example, in embodiments of system 1100 implementing wavelength dispersive metrology. In some other embodiments, detector 1170 is an energy dispersive detector, for example, in embodiments of system 1100 implementing energy dispersive metrology.

In another aspect, system 1100 includes IR camera systems 1150 and 1160 that perform thermal imaging of multiple optical elements of system 1100. As depicted in FIG. 1, IR camera 1150 is positioned such that portions of optical elements 1120 and 1121 coated with an IR emissive material are within the field of view of IR camera 1150. For example, areas 1122A and 1122B of optical element 1120 are coated with an IR emissive material, and areas 1123A and 11238 of optical element 1121 are coated with an IR emissive material. IR images 1151 collected by IR camera 1150 are communicated to computing system 1180 for analysis of the temperature distribution of optical elements 1120 and 1121. Similarly, IR camera 1160 is positioned such that portions of optical elements 1131-1134 coated with an IR emissive material are within the field of view of IR camera 1160. Furthermore, the areas of IR emissive material are located such that they do not obscure one another in the field of view of each respective IR camera. IR images 1161 collected by IR camera 1160 are communicated to computing system 1180 for analysis of the temperature distribution of optical elements 1131-1134.

System 1100 also includes a computing system 1180 employed to acquire signals 1171 generated by detector 1170, and determine one or more properties of the specimen based at least in part on the acquired signals. In a further embodiment, computing system 1180 is configured to access model parameters in real-time, employing Real Time Critical Dimensioning (RTCD), or it may access libraries of pre-computed models for determining a value of at least one specimen parameter value associated with the specimen 1140.

System 1100 includes a specimen positioning system 1141 configured to both align and orient specimen 1140 with respect the illumination source 1110 and detector 1170 of system 1100. Computing system 1180 communicates command signals (not shown) to a motion controller of specimen positioning system 1141 that indicates the desired position of specimen 1140. In response, the motion controller generates command signals to one or more actuators of specimen positioning system 1141 to achieve the desired positioning of specimen 1140.

In an aspect, computing system 1180 is configured to receive thermal images collected by IR cameras 1150 and 1160. Computing system 1180 is further configured to estimate the temperature distribution of each of the optical elements imaged by the IR cameras 1150 and 1160 based on the received thermal images. In embodiments, computing system 1180 is further configured to estimate the total amount of primary measurement radiation absorbed by each of the optical elements imaged by the IR cameras 1150 and 1160 based on the received thermal images. In one example, the amount of radiation absorbed by one or more of the optical elements is indicative of the spectrum of the primary illumination radiation. In another example, the amount of radiation absorbed by one or more of the optical elements is indicative of the transmission efficiency of an optical element for VUV spectra close to or below the absorption edge of the materials employed to construct the optical element (e.g., close to 120 nanometers).

In an aspect, computing system 1180 is configured to estimate the magnitude of damage to an optical element based on the received thermal images. A damaged optical element will exhibit higher temperatures and different temperature distribution characteristics. In this manner, the received thermal images are indicative of the health of the optical element.

In an aspect, computing system 1180 is configured to estimate the intensity of the primary illumination radiation based on the measured temperature profile of the absorptive optical element, or group of optical elements. In one example, the intensity of VUV illumination radiation is estimated in this manner without incurring additional radiation losses that would be necessary to perform the measurement in a conventional manner.

It should be recognized that the various steps described throughout the present disclosure may be carried out by a single computer system 1180 or, alternatively, multiple computer systems 1180. Moreover, different subsystems of the system 1100, such as the specimen positioning system 1140, IR cameras 1150 and 1160, or detector 1170, may include a computer system suitable for carrying out at least a portion of the steps described herein. Therefore, the aforementioned description should not be interpreted as a limitation on the present invention but merely an illustration. Further, the one or more computing systems 1180 may be configured to perform any other step(s) of any of the method embodiments described herein.

In addition, the computer system 1180 may be communicatively coupled to the IR cameras 1150 and 1160 in any manner known in the art. For example, the one or more computing systems 1130 may be coupled to computing systems associated with the IR cameras 1150 and 1160, respectively. In another example, any of the detector 1170 and IR cameras 1150 and 1160, may be controlled directly by a single computer system coupled to computer system 1180.

The computer system 1180 of the system 1100 may be configured to receive and/or acquire data or information from the subsystems of the system (e.g., detector 1170, IR cameras 1150 and 1160, and the like) by a transmission medium that may include wireline and/or wireless portions. In this manner, the transmission medium may serve as a data link between the computer system 1180 and other subsystems of the system 1100.

Computer system 1180 of the system 1100 may be configured to receive and/or acquire data or information (e.g., temperature measurement results, modeling inputs, modeling results, etc.) from other systems by a transmission medium that may include wireline and/or wireless portions. In this manner, the transmission medium may serve as a data link between the computer system 1180 and other systems (e.g., memory on-board system 1100, external memory, or external systems). For example, the computing system 1180 may be configured to receive measurement data (e.g., signals 1151, 1161, and 1171) from a storage medium (i.e., memory 1182) via a data link. For instance, temperature measurement results obtained using IR cameras 1150 and 1160 may be stored in a permanent or semi-permanent memory device (e.g., memory 1182). In this regard, the temperature measurement results may be imported from on-board memory or from an external memory system. Moreover, the computer system 1180 may send data to other systems via a transmission medium. For instance, temperature distributions determined by computer system 1180 may be stored in a permanent or semi-permanent memory device (e.g., an external memory). In this regard, measurement results may be exported to another system.

Computing system 1180 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 1184 implementing methods such as those described herein may be transmitted over a transmission medium such as a wire, cable, or wireless transmission link. For example, program instructions stored in memory 1182 are transmitted to processor 1181 over bus 1183. Program instructions 1184 are stored in a computer readable medium (e.g., memory 1182). Exemplary computer-readable media include read-only memory, a random-access memory, a magnetic or optical disk, or a magnetic tape.

The system 1100 includes an optical scatterometer system. However, in general, temperature measurements of optical elements associated with one or more different metrology or inspection techniques may be contemplated within the scope of this patent document.

In general, the temperature measurements described herein provide useful performance feedback for a wide range of optical metrology and inspection systems. The temperature measurement techniques described herein can improve the performance of Spectroscopic Ellipsometry (SE), Spectroscopic Reflectometry (SR), and/or Beam-Profile Reflectometry (BPR) systems used in film, critical dimension (CD), and composition metrology. Furthermore, the temperature measurement techniques described herein can improve the performance of substrate and mask inspection systems employed to detect defects of various types and sizes.

By way of non-limiting example, any of the following optical metrology techniques including, spectroscopic ellipsometry (including Mueller matrix ellipsometry), Mueller matrix spectroscopic ellipsometry, spectroscopic reflectometry, spectroscopic scatterometry, scatterometry overlay, beam profile reflectometry, (angle and polarization resolved), beam profile ellipsometry, single or multiple discrete wavelength ellipsometry, multiple angle of incidence ellipsometry, and/or spectroscopic polarimetry may be contemplated within the scope of this document.

Metrology techniques as described herein may be used to determine characteristics of semiconductor structures. Exemplary structures include, but are not limited to, FinFETs, low-dimensional structures such as nanowires or graphene, sub 10 nm structures, thin films, lithographic structures, through silicon vias (TSVs), memory structures such as DRAM, DRAM 4F2, FLASH and high aspect ratio memory structures, such as 3D-NAND structures. Exemplary structural characteristics include, but are not limited to, geometric parameters such as line edge roughness, line width roughness, pore size, pore density, side wall angle, profile, film thickness, critical dimension, and/or pitch, and/or material parameters such as electron density, crystalline grain structure, morphology, orientation, stress, strain, elemental identification, and/or material composition.

In embodiments, the measurement techniques described herein may be implemented as part of a fabrication process tool. Examples of fabrication process tools include, but are not limited to, lithographic exposure tools, film deposition tools, implant tools, and/or etch tools. In this manner, the results of the measurements are used to control a fabrication process.

Figure 2:
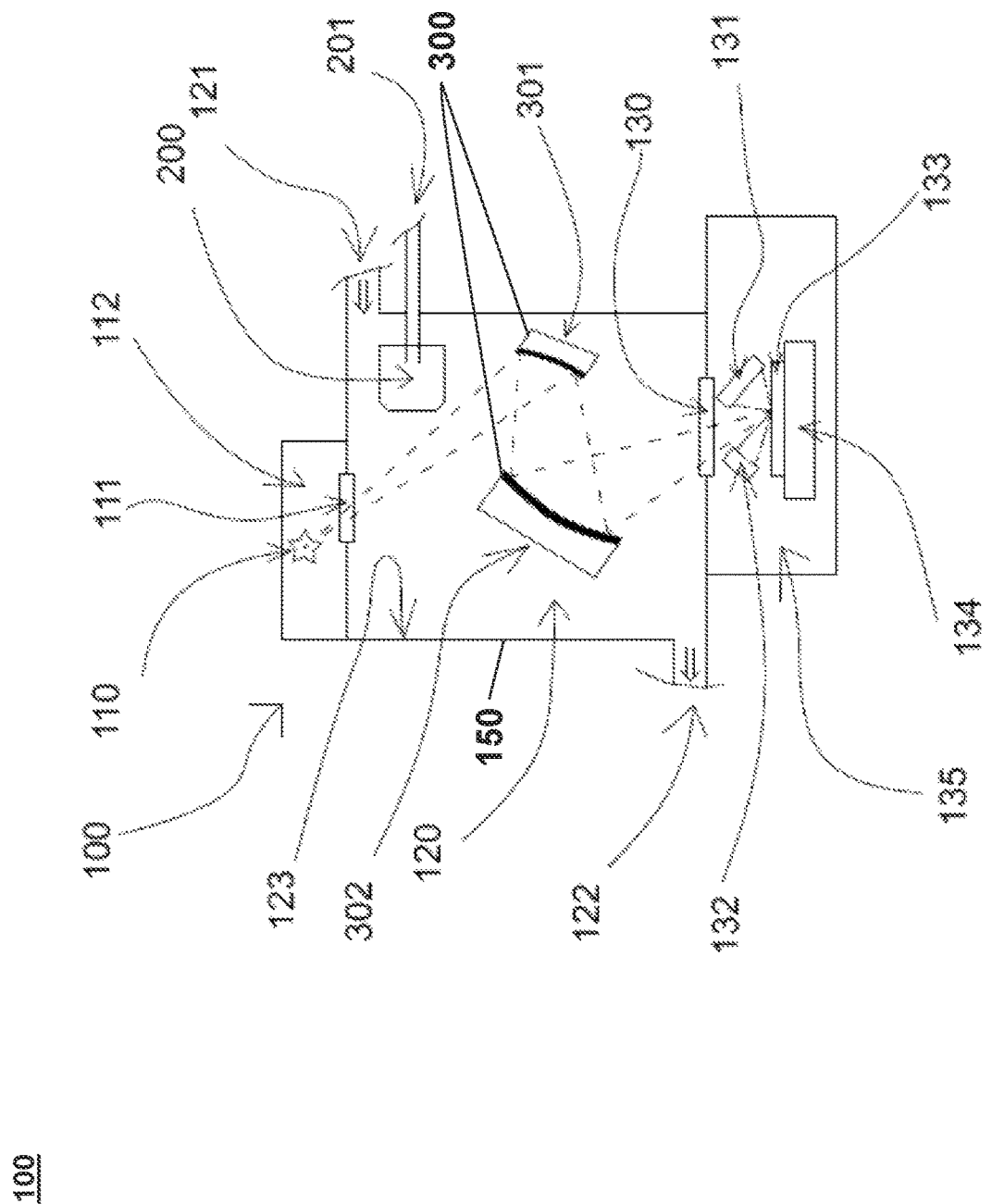
FIG. 2, which illustrates a schematic diagram of a vacuum ultraviolet (VUV) inspection system, in accordance with one or more embodiments.

Reference is now made to FIG. 2, which illustrates a schematic diagram of a VUV inspection system, in accordance with one or more embodiments. The VUV inspection system 100 includes an illumination source 110, VUV optics 300, substrate table 134 to support a substrate 133, sensors 131 and 132, cleaning system 200, supply line 121 and supply line 201. In embodiments, the VUV inspection system 100, like the optical measurement system 1100 of FIG. 1, may be used to perform optical substrate inspection. However, the VUV inspection system 100 may be constructed differently from the optical measurement system 1100. The optical measurement system 1100 is used to illustrate basic principles of optical substrate inspection. Some differences between optical measurement system 110 and the VUV inspection system 100 may include (1) while system 1100 includes a transparent bulb 1112, no bulbs may be used in system 100 as they may be too absorbing, a pumping laser radiation may be delivered to the VUV emitting target (gas jet or solid or liquid) through a window (e.g., optionally coated diamond or sapphire or glass or quartz or other sufficiently transparent material material), while VUV radiation propagates to the one or more mirrors 300 unperturbed or passing through a thin film membrane or mesh, acting as a partial gas seal or spectral purity filter, (2) while system 1100 uses one or more polarizers and one or more beam splitters, they may not be used in system 100, (3) VIS/IR/UV radiation may propagate at normal pressure in the system 1100, while the system 100 uses a low pressure environment for VUV source, optics and substrate, to minimize losses of VUV and, in an embodiment, comprises a noble gas.

The illumination source 110 may comprise, for example, a laser-induced or electrical discharge plasma source, which may output a radiation beam various wavelength. For example, the illumination source 110 may output a radiation beam in VUV wavelength (e.g., 20-120 nm, 10-200 nm, or other VUV wavelengths). The VUV optics 300 includes a number of mirrors (e.g., 2, 4, 6, or other number) that reflect and focus the radiation beam propagating through a VUV optics environment 120 onto the substrate 133 positioned on the substrate table 134. In the example of FIG. 2, the VUV optics 300 includes two mirrors (also referred to as "VUV mirrors"), such as a first VUV mirror 301 and a second VUV mirror 302, that reflect and focus the radiation beam onto the substrate 133 to be inspected. The VUV inspection system 100 may include a number of sensors, e.g., a first sensor 131 and a second sensor 132, that receive the radiation scattered from the substrate 133 to form an image of the substrate 133 or to acquire a spectral/angular distribution. Any of various types of imaging devices may be used as a sensor, such as a CCD array, a photodiode array, a CMOS detector, or a photomultiplier tube—optionally any of the systems may comprise a radiation-dispersing element(s). The images formed by the sensors are transmitted to a computing system (e.g., similar to computing system 1180 of FIG. 1) for further analysis.

In embodiments, the VUV inspection system 100 may have a first window 111 that separates a source environment 112 in which the illumination source 110 is located from the VUV optics environment 120 in which the VUV optics 300 is located. Similarly, the VUV inspection system 100 may include a second window 130 that separates the VUV optics environment 120 from a substrate environment 135 in which the substrate 133 is located. The radiation from the illumination source 110 may be output through the first window 111 and directed onto the substrate 133 (e.g., by the one or more VUV mirrors) through the second window 130. In embodiments, the VUV inspection system 100 may include a dynamic gas lock or a gas jet, instead of the first window 111, to separate the VUV optics environment 120 from the source environment 112. Similarly, the VUV inspection system 100 may have another dynamic gas lock or gas jet, instead of the second window 130, to separate the VUV optics environment 120 from the substrate environment 135. Any of the windows may comprise a thin film (e.g., thickness <10 um, desirably <1 um) or a fine mesh, substantially transparent to VUV radiation. Windows 111 and 130 can comprise a thin film (thickness of less than 1 um) or a fine mesh, sufficiently transparent to VUV.

The source environment 112 may contain one or more gases (e.g., noble gas, non-noble gas, non-inert gas or their mixtures). Similarly, the VUV optics environment 120 may contain one or more gases (e.g., hydrogen gas as pure gas or mixed with noble gases). The VUV inspection system 100 includes a supply line 121 for supplying one or more gases to the VUV optics environment 120 (e.g., noble gas, non-noble gas, non-inert gas or their mixtures) and an exhaust line 122 to pump the one or more gases out of the VUV optics environment 120.

The VUV inspection system 100 may include a cleaning system 200 that is used to clean one or more VUV mirrors. For example, the cleaning system 200 may clean by reducing oxides or carbides, removing water or hydrocarbons from the surface of the one or more VUV mirrors, which is described in detail at least with reference to FIGS. 4-7 below. The cleaning system 200 may include a supply system 201 for supplying one or more gases to the VUV optics environment 120 and for pumping the one or more gases out of the VUV optics environment 120. The cleaning system 200 may also be provided with electrical power. In embodiments, the supply system 201 may supply one or more gases (e.g., hydrogen ($H_2$) or a mix of hydrogen and a noble gas/gases), to the VUV optics environment 120. The hydrogen gas may be added to the noble gas of the VUV optics environment 120 in a specified concentration (e.g., such that resulting mix contains at least 0.1%). In embodiments, the concentration of the hydrogen gas in the VUV optics environment is in the range of 1-100%. An electron beam, plasma source, laser-induced discharge or HRG (e.g., illustrated in FIGS. 4-7) of the cleaning system 200 may cause ionization or dissociation of the one or more gases to generate active species of hydrogen (e.g., hydrogen ions, such as $H^+$, $H_2^+$, $H_3^+$, or hydrogen radicals such as $H^*$), which aid in removal of oxides, carbides, water or hydrocarbons from the surface of the one or more VUV mirrors.

In embodiments, the one or more VUV mirrors may include aluminum as a reflective material (e.g., either as solid or as a coating) and hydrogen ions or radicals may react with aluminum causing the reflective material to deteriorate. For example, a first reaction may be that the hydrogen radicals are adsorbed on the aluminum surface, later dissolve into the aluminum bulk and recombine as defects/dislocation trapping the hydrogen gas to form a pressurized void, that results in blisters on the surface, which reduces the reflectivity of the VUV mirror. The first reaction may be indicated using the below notation:

$$H^*(adsorbed) \rightarrow H(dissolved) \rightarrow H2(trapped) \Rightarrow \text{bubble or void in aluminum} \quad (1)$$

In another example, a second reaction may be that the hydrogen ions penetrate into the aluminum bulk, capture one or more electrons and later recombine as defects in the bulk of aluminum, trapping hydrogen gas to form pressurized voids, resulting in blisters on the surface, which reduces the reflectivity of the VUV mirror. The second reaction may be indicated using the below notation:

$$Hn+ \rightarrow H(dissolved) \rightarrow H2(trapped) \Rightarrow \text{bubble or void in aluminum} \quad (2)$$

In yet another example, a third reaction may be that hydrogen gas is adsorbed on the aluminum surface, it dissociates under irradiation by VUV (if cleaning takes place simultaneous with VUV exposure) and hydrogen radicals dissolve into the aluminum bulk and recombine as defects/dislocations trapping hydrogen gas to form pressurized voids, resulting in blisters on the surface, which reduces the reflectivity of the VUV mirror. The third reaction may be indicated using the below notation:

$$H2(gas) \rightarrow H2(adsorbed) + hv\_vuv \rightarrow H^*(adsorbed) \rightarrow H(dissolved) \rightarrow H2(trapped) \Rightarrow \text{bubble or void in aluminum} \quad (3)$$

Figure 3:
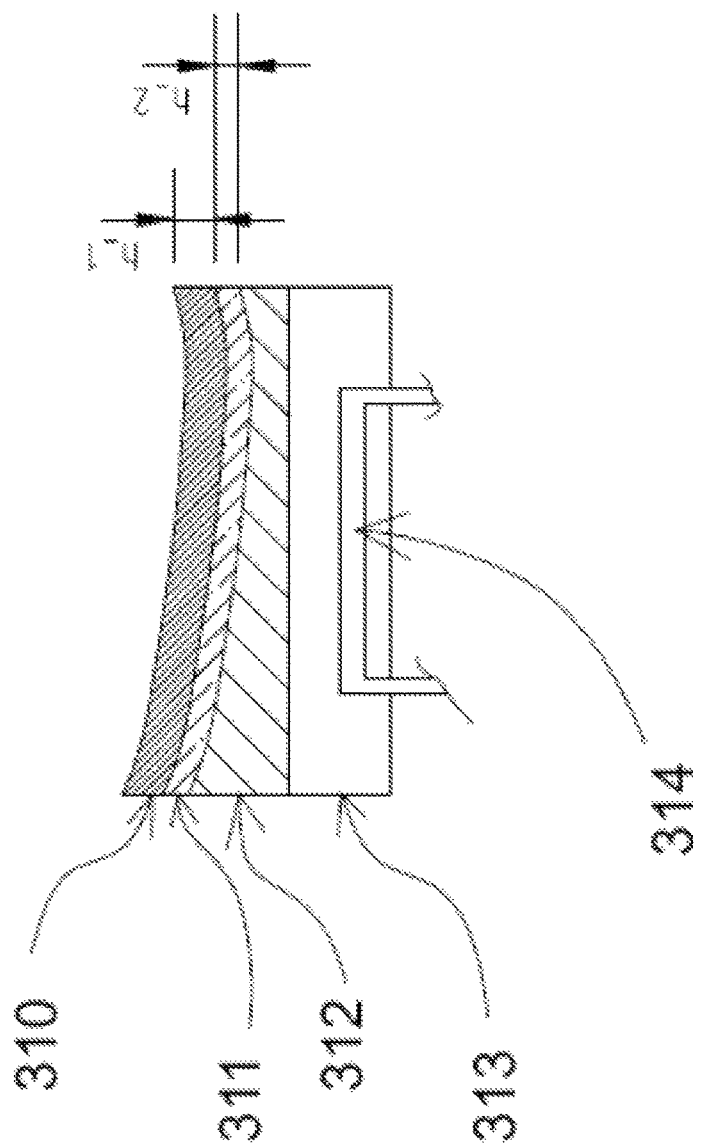
FIG. 3 illustrates a VUV mirror that may be used in the VUV inspection system of FIG. 2, in accordance with one or more embodiments.

In embodiments, in order to help prevent one or more of the above problems, the VUV mirror is constructed in a specific way. FIG. 3 illustrates a VUV mirror 350 that may be used in the VUV inspection system 100, in accordance with one or more embodiments. In embodiments, the VUV mirror 350 is similar to the VUV mirrors 301 and 302 of FIG. 2. The VUV mirror 350 comprises a reflective layer 312 on a base 313 of the mirror. The reflective layer 312 may be a coating of the reflective material (e.g., aluminum) or a solid layer of the reflective material. The VUV mirror 350 may also be coated with a protective coating 310 to protect the reflective layer 312. The protective coating 310 may contain one or more noble metals (e.g., Ru, Rh, Ag, Au, Pt, Ir, Os or other metals). In embodiments, the noble metal is selected based on a solubility or reflectivity of the noble metal. For example, a noble metal that has the lowest solubility in the reflective material (e.g., aluminum) is chosen from among a number of noble metals. In another example, a noble metal that has the lowest absorption for VUV wavelengths is chosen from among a number of noble metals. The protective coating 310 may contain one or more other elements as well. However, the individual alien atom (e.g., atoms of other elements) concentration may be below 50% and a total concentration of the alien atoms may be below 50% in the protective coating 310. Such a composition may help ensure very low or no oxidation of the coating at air, potentially reduce crystallinity, and improve layer adhesion.

In embodiments, the VUV mirror 350 may optionally include an adhesion layer 311 that promotes an adhesion of the protective coating 310 to the reflective layer 312. The adhesion layer 311 may also help prevent mixing of the noble metal coating with the reflective material. In embodiments, the thickness of such a layer may be less than 10 nm, desirably less than 3 nm. Further, the thickness of the adhesion layer 311 may be less than the thickness of the protective coating 310. In embodiments, having an adhesion layer 311 that is thinner than the protective coating 310 may solve some problems, including absorption above a threshold by the protective coating 310 and reflection above a threshold (e.g., out of phase) from the adhesion layer 311. In embodiments, having a thickness of both the protective coating 310 and the adhesion layer 311 less than 10 nm may enable maintaining good reflectivity of the VUV mirror 350.

In embodiments, having such a protective coating 310 may prevent the degradation of the reflective layer 312 (e.g., caused to due to the reactions mentioned above). For example, the protective coating 310 may prevent oxidation of aluminum when exposed to air, and may prevent formation of hydrogen blisters via the first or second or third reactions, by boosting of hydrogen outgassing (e.g., that may be direct or follow H* diffusion to the surface with subsequent association).

Further, the VUV mirror 350 may include an integrated thermal conditioning system 314 that enables acceleration of cleaning by elevated temperature to promote outgassing of gaseous products (e.g., water—$H_2O$, methane—$CH_4$, or other products) from the reflective layer 312 or the protective coating 310, resulting from the cleaning of the VUV mirror 350 with active hydrogen species. The thermal conditioning system 314 may heat the VUV mirror 350 to temperatures in a specified range (e.g., 25-200 degrees Celsius, or other temperature) that is advantageous for the cleaning. Optionally, additional/alternating cooling may be provided to reduce thermal load and facilitate settling the VUV inspection system 100 back to a steady state (e.g., a state in which the VUV inspection system 100 is ready to obtain images of the substrate 133). In embodiments, a maximum temperature range of the VUV optics 300 may be limited to a range of 50-100 degrees Celsius during the cleaning.

In embodiments, the thermal conditioning system 314 may be integrated into the base 313 (e.g., ceramic) of the VUV mirror 350. The thermal conditioning system 314 may be operated in pulses (e.g., after imaging the substrate 133 as opposed to simultaneously), and may be used when nominal cleaning is not sufficient. In embodiments, having such a VUV mirror 350 may minimize the degradation of reflective material.

In embodiments, the VUV inspection system 100 may also have one or more built-in IR sources to illuminate VUV surfaces (e.g., grazing the surfaces, or desirably at normal incidence) to agitate vibrational degrees of freedom of typical contaminants as adsorbed (e.g., $H_2O$, $CH_4$) and promote outgassing without significant thermal load at the reflective layer. In embodiments, the one or more IR sources may include a flash lamp or a narrow band mid IR laser.

Referring back to FIG. 2, a portion of vacuum chamber 150 forming the VUV optics environment 120 (e.g., one or more walls of the vacuum chamber 150, such as wall 123) and that faces the same gas environment as the VUV mirrors 301 and 302 (e.g., active species of hydrogen during cleaning) may be made of, or coated with a hydrogen-induced outgassing (HIO)-incapable material. Such HIO-incapable coating may not have, or have a concentration less than a threshold (e.g., less than 1%, desirably less than 0.1%) of, any of elements such as carbon, nitrogen, silicon, phosphorus, boron, lead, tin, zinc, indium, germanium, oxygen, fluorine, bromine, iodine, chlorine, copper, magnesium, aluminum, or other such elements that form volatile species with hydrogen ions or radicals or have a low sputtering threshold. In embodiments, the material for the HIO-incapable coating may include stainless steel (with Si and C below the above threshold), molybdenum, tungsten, or a noble metal coated material. In embodiments, a refractory metal such as molybdenum or tungsten may be a preferred material for the HIO-incapable coating, which may facilitate in suppressing any possible sputtering by radiation ions during cleaning. In embodiments, a significant portion of the VUV optics environment 120 (e.g., >50% of all surfaces facing the same environment as VUV optics environment 120) may be coated with a HIO-incapable coating.

In embodiments, a coating or bulk material for critical areas in the vacuum chamber 150 may be based on a transition, desirably refractory, metal or metal mix, with individual elements, or at least for elements with concentration above a threshold (e.g., greater than 1%), in the coating having a boiling point temperature above a specified threshold (e.g., greater than 2500 degrees Celsius or other temperature). Here, critical areas may include any areas within 30 cm from or with a line of sight to any of the reflecting surfaces, the cleaning system 200 or its parts (e.g., the electron beam) or the windows. Further, in embodiments, any alloyed parts containing elements with lower sputtering threshold than that of the material of the protective coating 310 for ions of the VUV gas environment or cleaning environment (e.g., Al, Mg, Zn, Pb, Cu, or other elements) are also coated with the above coating.

The cleaning system 200 may be used in a continuous mode or pulsed mode. Generally, the cleaning system 200 may be used in the continuous mode. In the continuous mode, the cleaning is performed at the same time as VUV operation for inspecting the substrate (e.g., while VUV rays are emitted from the illumination source 110 to perform metrology measurements of the substrate 133). In the pulsed mode, the cleaning system 200 may be used in alternating pulses (e.g., after a first VUV operation and prior to a subsequent VUV operation). In embodiments, a VUV operation may involve inspecting a single substrate or a batch of substrates. In embodiments, the cleaning system 200 may be moved as close to one or more VUV mirrors as needed (e.g., for optimal cleaning performance) and to avoid the cleaning system 200 being in the way of VUV rays for performing the inspection. The cleaning system 200 may be operated in pulsed mode. The cleaning system 200 may operate when VUV radiation is interrupted, or at least the inspection is interrupted. The timing of cleaning and subsequent settling of the inspection system may be synchronized with substrate inspection, for example, between substrates or substrate batches in order to minimize the impact on the throughput of inspections. Such an approach may help prevent radiation emitted from the cleaning system 200 from adding noise to the sensors 131 and 132 during inspection. The cleaning system 200 may also operate with inspection ongoing, provided the thermal load on the one or more mirrors is less or comparable to the VUV absorption, and the stray radiation reaching sensors 131 and 132 is tolerated.

Figure 4:
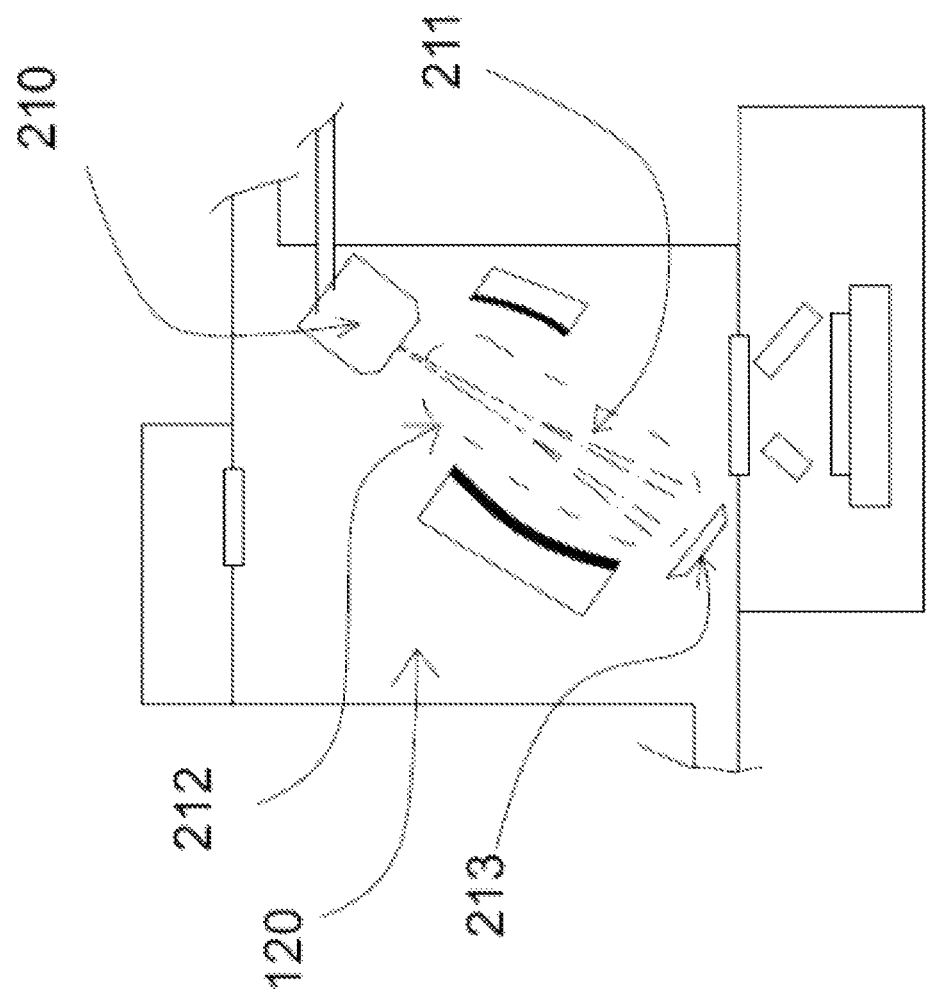
FIG. 4 is a schematic diagram illustrating an electron-beam based ionizer used in a cleaning system of the VUV inspection system of FIG. 2, in accordance with one or more embodiments.

FIG. 4 is a schematic diagram illustrating an electron-beam based ionizer used in a cleaning system of the VUV inspection system of FIG. 2, in accordance with one or more embodiments. The cleaning system 200 includes an electron-beam based ionizer 210 in the vicinity of the VUV optics 300. The electron-beam based ionizer 210 outputs an e-beam 211 into the VUV optics environment 120. The e-beam 211 ionizes the one or more gases present in the VUV optics environment 120 (e.g., hydrogen as pure gas or mixed with noble gases) to generate hydrogen ions or radicals forming a cleaning environment 212. The cleaning environment 212 performs the cleaning of the VUV optics 300 by removing water or hydrocarbons from the one or more VUV mirrors of the VUV optics 300. In embodiments, the cleaning system 200 may include an e-beam dump 213 that intercepts the unspent e-beam. In embodiments, the e-beam 211 may be configured to sweep over a cross-section between or along the VUV optics 300 to homogenize a flux of the hydrogen ions or radicals to any of the one or more VUV mirrors.

The e-beam 211 may have an energy in a specified range (e.g., 10 Volts-10 kilo Volts, or other ranges). In embodiments, a desired range of the e-beam energy may be 100-1000 V. The e-beam current may be in the range 1 mA-1A, desirably 10-100 mA. The gas pressure in the VUV optics environment 120 may be maintained in a specified range (e.g., greater than 0.01 Pascal, or other ranges). In embodiments, the gas pressure may be lower than the gas pressure during VUV inspection (e.g., less than 1000 Pa). In embodiments, the gas pressure is desirably maintained in the range of 1-100 Pa.

In embodiments, to further aid in cleaning of the VUV optics 300, one or more VUV mirrors may be used as electrodes to collect the e-beam current or alternatively the ion current, at least partially, during cleaning. In embodiments, this may be achieved by grounding or biasing one or more VUV mirrors during cleaning. For example, one or more VUV mirrors be biased positively in a specified range (e.g., 0 to 100 V, or other range). In embodiments, when the one or more VUV mirrors are biased positively, the e-beam 211, by scattering and partial electron current collection, may contribute to dissociation of $H_2$ adsorbed at the VUV mirror or may contribute to ionization or dissociation of $H_2$ in immediate vicinity of VUV mirror. Alternatively, one or more VUV mirrors may be biased negatively in a specified range (e.g., −1 to −100 V, or other range) to attract more ions and add energy to ions during cleaning. Further, the bias may be set such that a sputtering threshold for the protective coating or the reflective layer (accounting for ion energy attenuation, as they propagate partially through the protective coating) may not be exceeded.

Figure 5:
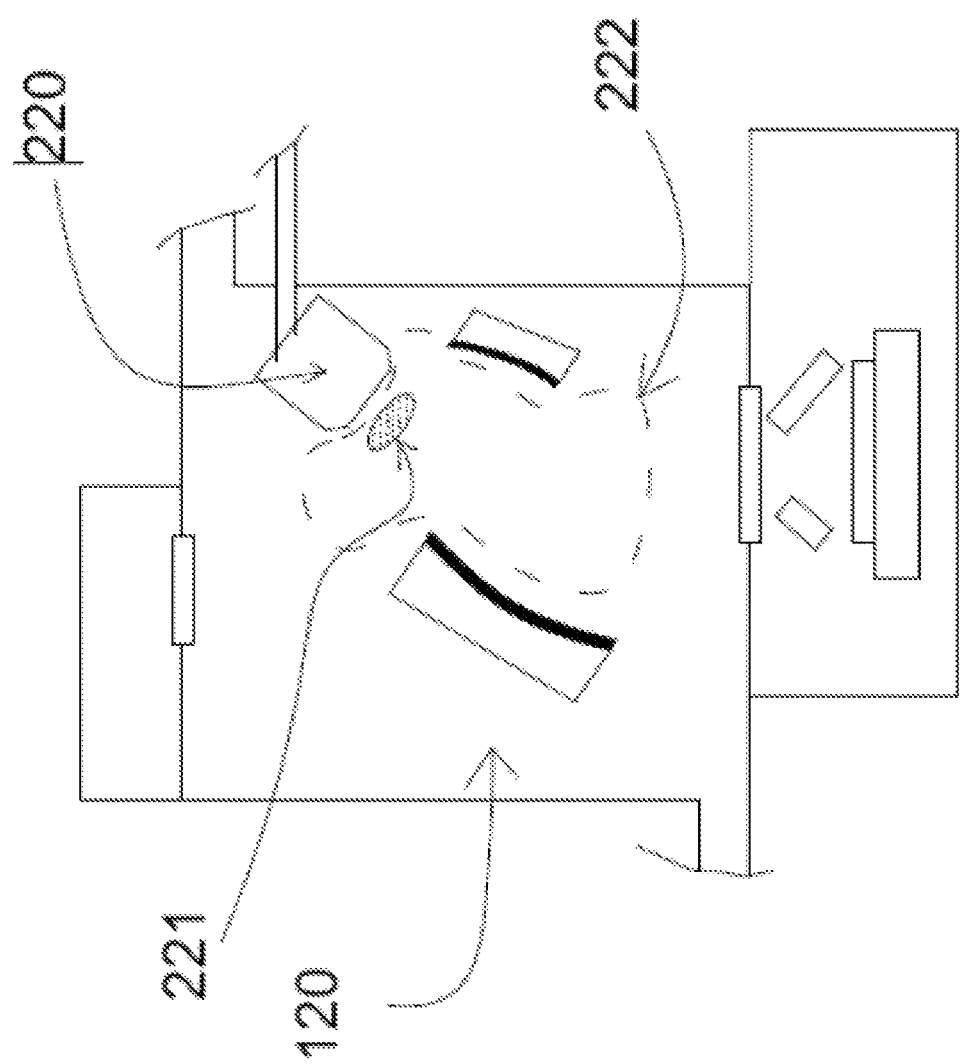
FIG. 5 is a schematic diagram illustrating a plasma-based ionizer used in a cleaning system of the VUV inspection system of FIG. 2, in accordance with one or more embodiments.

FIG. 5 is a schematic diagram illustrating a plasma-based ionizer used in a cleaning system of the VUV inspection system of FIG. 2, in accordance with one or more embodiments. The cleaning system 200 includes a plasma-based ionizer 220 in the vicinity of the VUV optics 300. The plasma-based ionizer 220 outputs plasma 221 into the VUV optics environment 120. The plasma 221 ionizes the one or more gases present in the VUV optics environment 120 (e.g., hydrogen as pure gas or mixed with noble gases) to generate hydrogen ions or radicals forming a cleaning environment 222. The cleaning environment 222 performs the cleaning of the VUV optics 300 by removing water or hydrocarbons from the one or more VUV mirrors of the VUV optics 300.

The plasma 221 may have an electron temperature in a specified range (e.g., greater than 0.1 eV, or other range). In embodiments, a desired range of the electron temperature may be 1-10 eV. The gas pressure in the VUV optics environment 120 may be maintained in a specified range (e.g., greater than 0.01 Pascal, or other range). In embodiments, the gas pressure may be lower than the gas pressure during VUV inspection (e.g., less than 1000 Pa). In embodiments, the gas pressure is maintained in the range of 1-1000 Pa.

In embodiments, a miniaturized plasma source (e.g., power of less than 10 Watts) or an e-beam source (e.g., current less than 10 mA, e-beam energy less than 1 kV, desirably in the range of 50-500 V) may be used for cleaning at low pressure (e.g., either in continuous or pulsed mode) as the demand for the hydrogen ions or radicals is rather modest. In embodiments, such sources may be, for example, based on miniaturized electron cyclotron resonance (ECR) plasma, miniaturized radio frequency (RF)-source, or other sources. Multiple e-beam sources or plasma sources may be used, for example a dedicated source per each VUV mirror.

In embodiments, the plasma forming gas supplied by the cleaning system 200 may be different from the gas supplied to the one or more VUV mirrors during cleaning. For example, the plasma forming gas may contain hydrogen or contain no hydrogen, have a different concentration of hydrogen, or have a different noble gas (e.g., He instead of heavier noble gases typically supplied to the VUV optics) as this may prevent collateral physical or chemical sputtering of the plasma source or electron beam source surfaces by heavy or chemically active ions that may be a source of uncleanable contamination on one or more VUV mirrors. Typically, the plasma forming gas supply measured in normal liters per minute is <0.1×, desirably <0.01× than the gas supply direct to VUV optics, so it may not significantly perturb the gas composition in the chamber, and so, gas composition settling time after cleaning is finished is minimized or reduced. The plasma forming gas is the gas supplied to the (miniaturized) plasma-based ionizer 220 or to the plasma-based electron beam source. In embodiments, a composition of gas supplied for the cleaning operation may be similar to or different from a composition of gas provided near the VUV optics, due to mixing of the plasma forming gas and gas supplied for the VUV operation. In embodiments, supply line 121 of the VUV chamber 150 may continue operation or may be interrupted/reduced during the cleaning.

Figure 6:
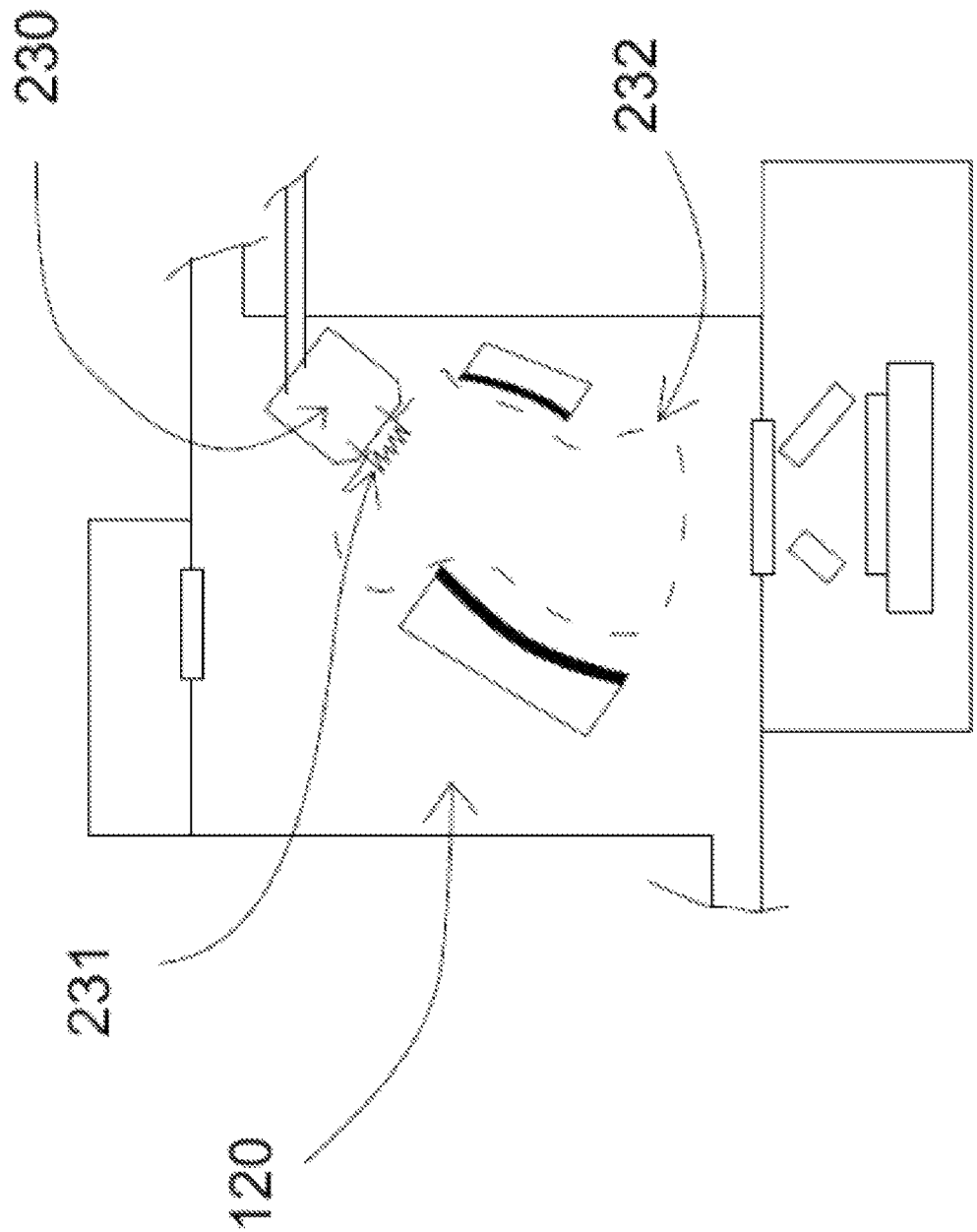
FIG. 6 is a schematic diagram illustrating a hydrogen radical generator (HRG) used in a cleaning system of the VUV inspection system of FIG. 2, in accordance with one or more embodiments.

FIG. 6 is a schematic diagram illustrating an HRG used in a cleaning system of the VUV inspection system of FIG. 2, in accordance with one or more embodiments. The cleaning system 200 includes an HRG 230 in the vicinity of the VUV optics 300. The HRG 230 may include a tungsten filament 231 that may reach temperatures in the range of above 1000 degrees Celsius. The temperature of the tungsten filament 231 dissociates the one or more gases present in the VUV optics environment 120 (e.g., hydrogen as pure gas or mixed with one or more noble gases) to generate hydrogen radicals forming a cleaning environment 232. In embodiments, atomic hydrogen propagates by flow or diffusion to the VUV optics 300 mostly within the cleaning environment 232. The cleaning environment 232 performs the cleaning of the VUV optics 300 by removing water or hydrocarbons from the one or more VUV mirrors of the VUV optics 300. In embodiments, the cleaning system 200 using the HRG 230 may be operated in pulsed mode. Further, in embodiments, the one or more VUV mirrors may temporarily deform due to high temperatures of the tungsten filament 231, while thermal conditioning system 314 may suppress or cancel such an effect.

The gas pressure in the VUV optics environment 120 during the operation of HRG may be maintained in a specified range (e.g., greater than 0.01 Pascal, or other range). In embodiments, the gas pressure is maintained in the range of 1-1000 Pa.

Figure 7:
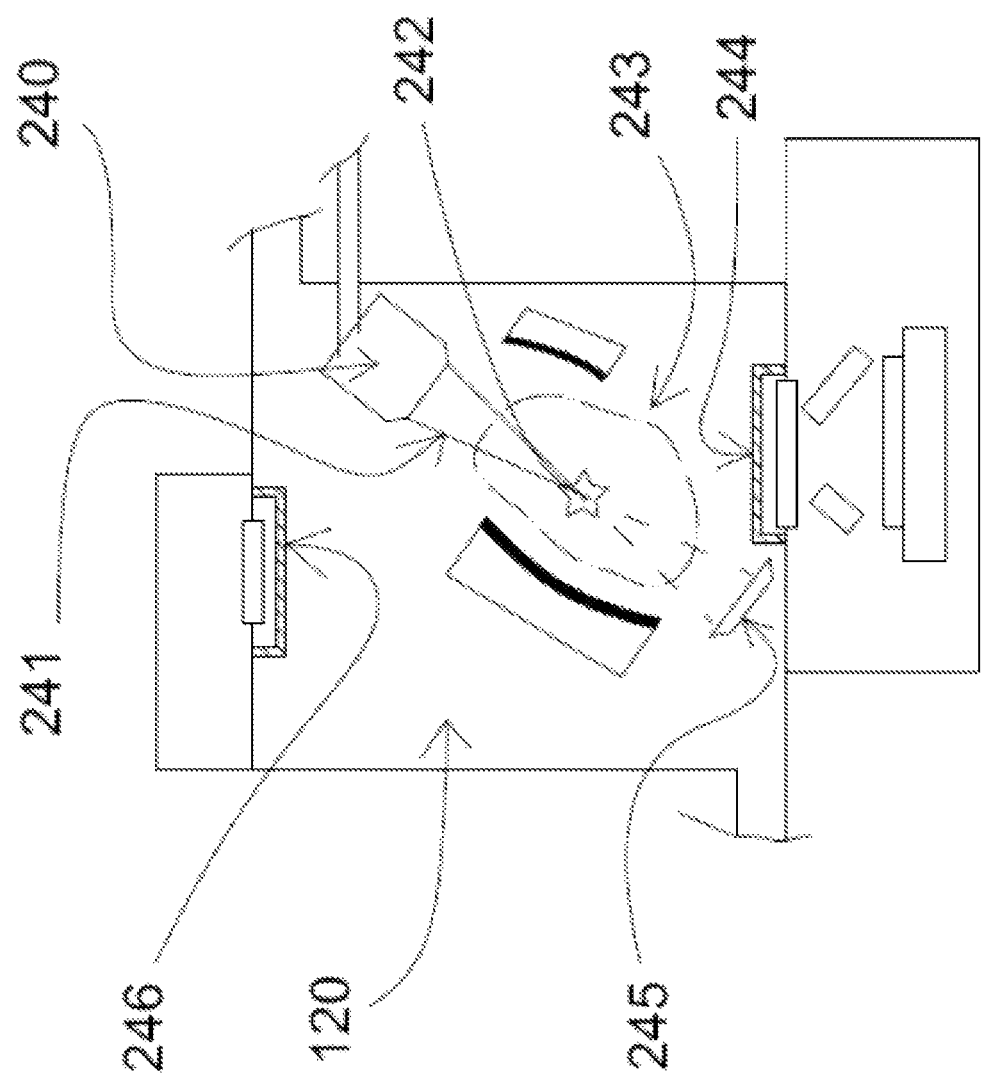
FIG. 7 is a schematic diagram illustrating a laser induced discharge-based ionizer ("laser-based ionizer") used in a cleaning system of the VUV inspection system of FIG. 2, in accordance with one or more embodiments.

FIG. 7 is a schematic diagram illustrating a laser induced discharge-based ionizer ("laser-based ionizer") used in a cleaning system of the VUV inspection system of FIG. 2, in accordance with one or more embodiments. The cleaning system 200 includes a laser-based ionizer 240 in the vicinity of the VUV optics 300. The laser-based ionizer 240 may produce a focused laser beam 241 that propagates through the VUV optics environment 120 causing a laser induced discharge 242. The laser induced discharge 242 ionizes the one or more gases present in the VUV optics environment 120 (e.g., hydrogen as pure gas or mixed with noble gases) to generate hydrogen ions or radicals forming a cleaning environment 243. In embodiments, atomic hydrogen propagates by flow or diffusion to the VUV optics 300 mostly within the cleaning environment 232. The cleaning environment 232 performs the cleaning of the VUV optics 300 by removing water or hydrocarbons from the one or more VUV mirrors. The laser may be continuous wave (CW) or pulsed laser, the duration of the pulsed laser is desirably 10 ns or less, as it may allow better coupling of laser energy to plasma generation.

The gas pressure in the VUV optics environment 120 may be maintained in a specified range (e.g., greater than 100 Pascals, or other range). In embodiments, the gas pressure is maintained in the range of 1000-100,000 Pa. In embodiments, the pressure near VUV optics 300 may vary from VUV inspection mode to cleaning mode significantly (e.g., by more than ten times). The gas pressure may even exceed atmospheric pressure during cleaning (e.g., in the range of 0.1-10 bar), and may desirably be maintained in the range of 1-5 bar (or 100,000 to 500,000 Pa). Such a pressure during cleaning may be advantageous, since it allows use of a laser-induced spark 242 as the source of active species. In embodiments, laser-induced spark 242 is a good electrodeless discharge with the active species (e.g., hydrogen ions or radicals) created locally and far from any sputtering-capable surfaces.

In embodiments, the VUV optics 300 may guide, at least partially, the laser radiation needed to provide a laser spark 242 near any one of the one or more VUV mirrors (e.g., by introducing a focusing optical element on demand during cleaning and removing during inspection). The laser spark 242 shall be sufficiently distant from the VUV optics 300 (e.g., greater than 1 millimeter, or other distances) to avoid sputtering risk by high energy ions. In embodiments, the laser spark 242 is desirably more than 10 millimeters from the VUV optics 300.

The laser spark 242 may be scanned (e.g., in x, y, or z directions) along any VUV mirror surface to employ local cleaning. Typically, the laser spark volume is small, for example less than 10 mm$^3$ and any dimension of the laser spark is less than 3 mm. Due to recombination or association, the concentration of useful species drops faster than $1/R^2$ from the point-like source that is the laser induced spark. Here, R is the distance from the laser spark to the nearest reflecting surface.

In embodiments, the laser peak fluence or peak flux at the VUV optics 300 may not exceed an intensity of 1 W/cm$^2$ (CW laser power or averaged pulsed laser power) and may not exceed 0.1 J/cm$^2$ (for pulsed laser)—to avoid damaging the surface.

In embodiments, the same noble gas that is used for VUV inspection operation may be used for cleaning as well with some hydrogen gas added.

The cleaning system 200 may also include a beam dump 245 that intercepts unspent laser beam. One or more gate valves, such as a first gate valve 244 and a second gate valve 246, provide pressure containment for the cleaning at relatively high pressure (e.g., by being temporarily closed). In embodiments, the one or more gate valves close when thin film window 111 and/or 130 (which are transparent for VUV inspection) that separate VUV source environment 112 and the substrate environment 135 from the VUV optics environment 120 may not withstand pressure difference and there is a risk of failure.

Figure 8:
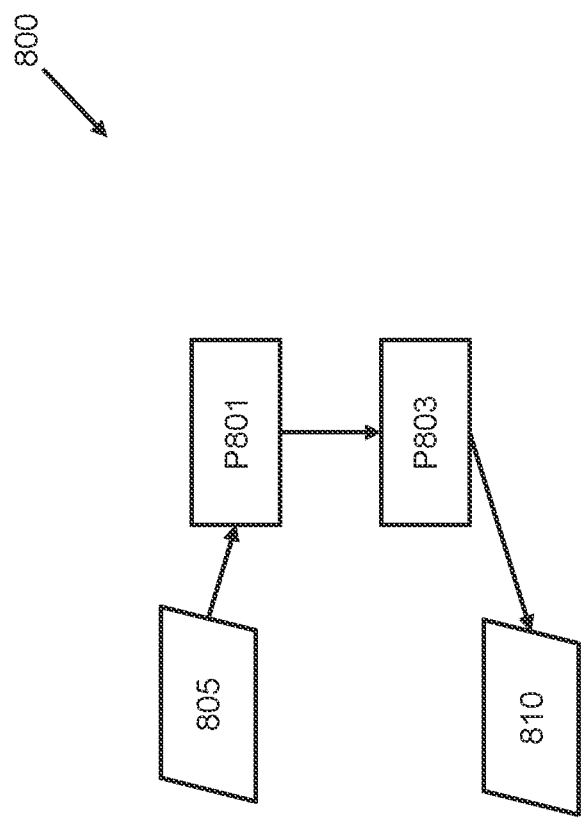
FIG. 8 is a flow diagram of a process for cleaning a VUV inspection system, in accordance with one or more embodiments.

FIG. 8 is a flow diagram of a process 800 for cleaning a VUV inspection system, in accordance with one or more embodiments. In embodiments, the process 800 may be implemented in the VUV inspection system 100 of FIG. 2. In operation P801, hydrogen gas 805 is supplied to VUV optics environment of the inspection system. For example, the supply system 201 may add hydrogen gas in a specified concentration (e.g., 0-10%, desirably less than 1%), to the one or more noble gases in the VUV optics environment 120 if VUV irradiation is present (e.g., when VUV is emitted from the illumination source 110 for performing inspection of a substrate). In another example, the supply system 201 may add hydrogen gas in another concentration (e.g., 1%-100%), to the one or more noble gases in the VUV optics environment 120 when the cleaning is performed, and no VUV irradiation is present.

In operation P803, the hydrogen gas is ionized to generate hydrogen ions or radicals 810, which clean the VUV optics by removing water or hydrocarbons from the one or more VUV mirrors. For example, hydrogen gas may be ionized using an ionizer such as an e-beam based ionizer 210, a plasma-based ionizer 220, or a laser-based ionizer 240 or dissociated using an HRG 230, as illustrated in FIGS. 4-7 to generate the hydrogen ions or radicals 810 for cleaning the one or more VUV mirrors.

Figure 9:
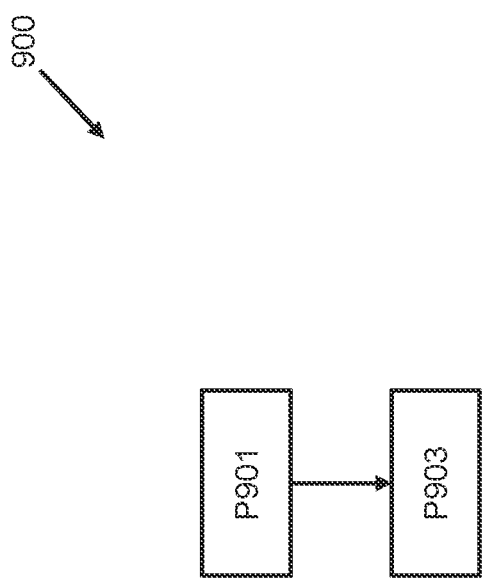
FIG. 9 is a flow diagram of a process for ionizing and generating radicals from hydrogen gas using e-beam based ionizer, in accordance with one or more embodiments.

FIG. 9 is a flow diagram of a process 900 for ionizing hydrogen gas using e-beam based ionizer, in accordance with one or more embodiments. In embodiments, the process 900 may be implemented using the e-beam based ionizer of FIG. 4 in the VUV inspection system 100 of FIG. 2 and as part of operation P803 of process 800. In operation P901, the e-beam based ionizer is operated to output an e-beam into VUV optics environment with a specified energy. For example, the e-beam based ionizer 210 is operated to output an e-beam into the VUV optics environment 120 with an energy in a range of 10 volts to 10 kilo volts. In embodiments, a range of the e-beam energy may be 100-1000 V. The e-beam ionizes the one or more gases present in the VUV optics environment 120 (e.g., hydrogen as pure gas or mixed with one or more noble gases) to generate hydrogen ions or radicals. The e-beam may be focused with focusing length 0.1-0.5 of the distance from electron beam-based ionizer 210 to the electron beam dump 213.

In operation P903, a pressure of the one or more gases in the VUV optics environment during e-beam based cleaning is maintained in a specified range (e.g., greater than 0.01 Pascal). In embodiments, the gas pressure is maintained in the range of 1-100 Pa.

Figure 10:
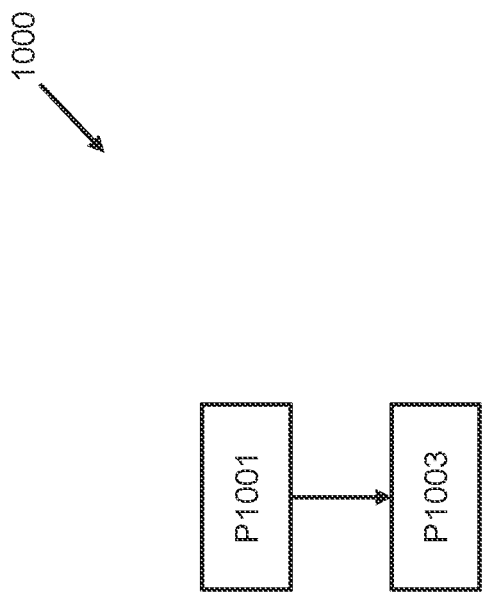
FIG. 10 is a flow diagram of a process for ionizing and generating radicals from hydrogen gas using plasma-based ionizer, in accordance with one or more embodiments.

FIG. 10 is a flow diagram of a process 1000 for ionizing hydrogen gas using plasma-based ionizer, in accordance with one or more embodiments. In embodiments, the process 1000 may be implemented using the plasma-based ionizer of FIG. 5 in the VUV inspection system 100 of FIG. 2 and as part of operation P803 of process 800. In operation P1001, the plasma-based ionizer is operated to output plasma into VUV optics environment with a specified electron temperature. For example, the plasma-based ionizer 220 is operated to output plasma 221 into the VUV optics environment 120 with an electron temperature of greater than 0.1 eV. In embodiments, a range of the electron temperature may be 1-10 eV. The plasma 221 ionizes the one or more gases present in the VUV optics environment 120 (e.g., hydrogen as pure gas or mixed with one or more noble gases) to generate hydrogen ions or radicals.

In operation P1003, a pressure of the one or more gases in the VUV optics environment is maintained in a specified range (e.g., greater than 0.01 Pascal). In embodiments, the gas pressure is maintained in the range of 1-1000 Pa.

Figure 11:
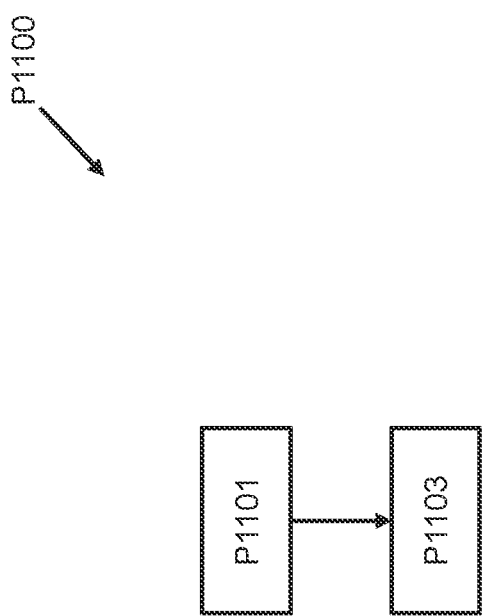
FIG. 11 is a flow diagram of a process for generating radicals from hydrogen gas using HRG, in accordance with one or more embodiments.

FIG. 11 is a flow diagram of a process P1100 for dissociating hydrogen gas using an HRG, in accordance with one or more embodiments. In embodiments, the process P1100 may be implemented using the HRG of FIG. 6 in the VUV inspection system 100 of FIG. 2, and as part of operation P803 of process 800. In operation P1101, the HRG is operated to achieve a tungsten filament temperature in a specified range. For example, the HRG 230 is operated such that the temperature of a tungsten filament 231 may be in the range of above 1000 degrees Celsius. The hot tungsten filament 231 dissociates the one or more gases present in the VUV optics environment 120 (e.g., hydrogen as pure gas or mixed with one or more noble gases) to generate hydrogen radicals.

In operation P1103, a pressure of the one or more gases in the VUV optics environment is maintained in a specified range (e.g., greater than 0.01 Pascal). In embodiments, the gas pressure is maintained in the range of 1-1000 Pa.

FIG. 12 is a flow diagram of a process 1200 for ionizing hydrogen gas using laser-based ionizer, in accordance with one or more embodiments. In embodiments, the process 1200 may be implemented using the laser-based ionizer of FIG. 6 in the VUV inspection system 100 of FIG. 2, and as part of operation P803 of process 800. In operation P1201, the laser-based ionizer is operated to output a focused laser beam in the VUV optics environment causing a laser-induced spark. For example, the laser-based ionizer 240 may produce a focused laser beam 241 that propagates through the VUV optics environment 120 causing a laser induced discharge 242. The laser induced discharge 242 ionizes the one or more gases present in the VUV optics environment 120 (e.g., hydrogen as pure gas or mixed with one or more noble gases) to generate hydrogen ions or radicals.

In operation P1203, a pressure of the gases in the VUV optics environment is maintained in a specified range (e.g., greater than 100 Pa). In embodiments, the gas pressure is desirably maintained in the range of 1-1000 Pa. The gas pressure may even exceed atmospheric pressure during cleaning (e.g., in the range of 0.1-10 bar), and may be maintained in the range of 1-5 bar.

Relative dimensions of components in drawings may be exaggerated for clarity. Within the description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Further embodiments according to the present invention are described in below numbered clauses:

1. A method for cleaning vacuum ultraviolet (VUV) optics of an inspection system, the method comprising:
   supplying hydrogen gas to an environment of VUV optics in the inspection system, wherein the VUV optics includes one or more VUV mirrors, the one or more VUV mirrors coated with a protective coating comprising a noble metal; and
   causing ionization of the hydrogen gas to generate hydrogen ions or radicals, wherein the hydrogen ions or radicals clean the VUV optics.

2. The method of clause 1, wherein causing ionization ion of the hydrogen gas includes cleaning the VUV optics by removing oxides, carbides, water or hydrocarbons from a surface of the one or more VUV mirrors using the hydrogen ions or radicals.

3. The method of clause 1, wherein the noble metal is selected based on a solubility of the noble metal in a reflective material of the one or more VUV mirrors.

4. The method of clause 3, wherein the noble metal having a lowest solubility in the reflective material is selected.

5. The method of clause 3, wherein the reflective material comprises aluminum.

6. The method of clause 1, wherein the noble metal is selected based on an absorption of the VUV by the noble metal.

7. The method of clause 6, wherein the noble metal having a lowest absorption is selected.

8. The method of clause 1, wherein the noble metal includes one or more of ruthenium, rhodium, iridium, osmium, silver, gold, or platinum.

9. The method of clause 1, wherein supplying the hydrogen gas includes supplying the hydrogen gas as a pure gas or mixed with one or more noble gases.

10. The method of clause 1, wherein supplying the hydrogen gas includes supplying the hydrogen gas in the environment of VUV optics in which the protective coating has a thickness of less than 3 nanometers.

11. The method of clause 1, wherein supplying the hydrogen gas includes supplying the hydrogen gas in the environment of VUV optics in which the protective coating has a thickness of less than 10 nanometers.

12. The method of clause 1, wherein supplying the hydrogen gas includes supplying the hydrogen gas in the environment of VUV optics in which the protective coating of a VUV mirror includes one or more elements in addition to the noble metal, wherein a concentration of each element of the one or more elements is less than 50% of composition of the protective coating.

13. The method of clause 12, wherein a total concentration of the one or more elements is less than 50% of the composition of the protective coating.

14. The method of clause 1, wherein supplying the hydrogen gas includes supplying the hydrogen gas in the environment of VUV optics in which the protective coating of a VUV mirror is adhered to a reflective material of the VUV mirror using an adhesion layer.

15. The method of clause 14, wherein the adhesion layer prevents mixing of the noble metal with the reflective material.

16. The method of clause 14, wherein supplying the hydrogen gas includes supplying the hydrogen gas in the environment of VUV optics in which the adhesion layer has a thickness of less than 3 nanometers.

17. The method of clause 14, wherein supplying the hydrogen gas includes supplying the hydrogen gas in the environment of VUV optics in which the adhesion layer has a thickness of less than 10 nanometers.

18. The method of clause 14, wherein supplying the hydrogen gas includes supplying the hydrogen gas in the environment of VUV optics in which the adhesion layer has a thickness lesser than that of the protective coating.

19. The method of clause 1, wherein supplying the hydrogen gas includes maintaining a concentration of the hydrogen gas in the environment of VUV optics based on whether a cleaning operation for cleaning of the one or more VUV mirrors is being performed or a VUV operation for inspecting one or more substrates is being performed.

20. The method of clause 19, wherein the concentration of the hydrogen gas is in a range of 0 to 10% of a total concentration of all gases in the environment of VUV optics during the VUV operation.

21. The method of clause 20, wherein the concentration of the hydrogen gas is less than 1% of a total concentration of all gases in the environment of VUV optics during the VUV operation.

22. The method of clause 19, wherein the concentration of the hydrogen gas is in a range of 1-100% of a total concentration of all gases in the environment of VUV optics when the cleaning operation is being performed and the VUV operation is not being performed.

23. The method of clause 1, wherein causing ionization of the hydrogen gas includes causing ionization or dissociation of the hydrogen gas using a cleaning system that is based on a hydrogen radical generator (HRG), an electron beam, a plasma source, or laser induced spark.

24. The method of clause 1, wherein causing ionization of the hydrogen gas includes:
   operating a HRG to achieve a HRG filament temperature of over 1000 degree Celsius to generate the hydrogen radicals; and
   maintaining a pressure of gases in the environment of VUV optics greater than 0.01 Pascal.

25. The method of clause 24, wherein the pressure is maintained in a range of 1 to 1000 Pascal.

26. The method of clause 1, wherein causing ionization of the hydrogen gas includes:
   outputting plasma in the environment of VUV optics with electron temperature of over 0.1 electron volts; and
   maintaining a pressure of gases in the environment of VUV optics greater than 0.01 Pascal.

27. The method of clause 26, wherein the electron temperature is maintained in a range of 1 to 10 electron volts.

28. The method of clause 26, wherein the pressure is maintained in a range of 1 to 1000 Pascal.

29. The method of clause 26, wherein causing ionization of the hydrogen gas based on the plasma includes supplying the hydrogen gas in a different concentration or the hydrogen gas with a different noble gas that is supplied to the environment of VUV optics.

30. The method of clause 1, wherein causing ionization of the hydrogen gas includes:
   outputting an electron beam into the VUV optics environment with an electron beam energy in a range of 10 volts to 10 kilo volts; and
   maintaining a pressure of gases in the environment of VUV optics greater than 0.01 Pascal.

31. The method of clause 30, wherein the electron beam energy is maintained in a range of 100 to 1000 volts.

32. The method of clause 30, wherein the pressure is maintained in a range of 1 to 1000 Pascal.

33. The method of clause 30, wherein the electron beam is focused with a focusing distance of 0.1 to 0.5 of a distance between a source of the electron beam and an electron-beam dump in the inspection system.

34. The method of clause 30, further comprising configuring the one or more VUV mirrors as electrodes to collect at least a portion of electron beam current or, oppositely, ion current.

35. The method of clause 30, wherein the one or more VUV mirrors is biased positive to promote additional ionization or dissociation near or at the surface of the one or more VUV mirrors in order to boost cleaning rate.

36. The method of clause 35, wherein the one or more VUV mirrors is biased positive in a range of +1 to +100 volts.

37. The method of clause 30, wherein the one or more VUV mirrors is biased negative to attract the hydrogen ions or noble gas ions and increase their energy in order to boost cleaning rate.

38. The method of clause 37, wherein the one or more VUV mirrors is biased negative in a range of −1 to −100 volts.

39. The method of clause 1, wherein causing ionization of the hydrogen gas includes:
   outputting a laser beam in the environment of VUV optics causing a laser-induced discharge; and
   maintaining a pressure of gases in the environment of VUV optics greater than 100 Pascal.

40. The method of clause 39, wherein the pressure is maintained in a range of 1000 to 10,000 Pascal.

41. The method of clause 39, wherein the pressure is maintained in a range of 100,000 to 500,000 Pascal.

42. The method of clause 39, wherein the pressure is maintained using one or more gate valves in the environment of VUV optics, wherein the one or more gate valves separates the environment of VUV optics from a low-pressure environment having a substrate to be inspected or from a low-pressure environment of a source of the VUV.

43. The method of clause 39, wherein the laser induced discharge and the VUV optics are separated by a specified distance to avoid sputtering by the hydrogen ions or radicals or heavy noble gas ions.

44. The method of clause 43, wherein the specified distance is greater than 1 millimeter.

45. The method of clause 43, wherein the specified distance is greater than 10 millimeters.

46. The method of clause 39, wherein the laser beam is pulsed, and wherein a duration of a pulse is 10 nanoseconds or less.

47. The method of clause 39, wherein the laser beam has a peak fluence not exceeding 1 W/cm$^2$ and a peak flux not exceeding 0.1 J/cm$^2$.

48. The method of clause 1, further comprising coating one or more interior walls of the inspection system proximate the environment of VUV optics with hydrogen-induced outgassing (HIO)-incapable coating.

49. The method of clause 48, wherein the one or more interior walls of the inspection system proximate the environment of VUV optics includes more than 50% of surfaces of the inspection system facing the environment of VUV optics.

50. The method of clause 48, wherein the HIO-incapable coating includes one or more refractory metals.

51. The method of clause 50, wherein the one or more refractory metals includes molybdenum or tungsten.

52. The method of clause 48, wherein the HIO-incapable coating includes one or more metals with boiling temperature of greater than 2500 degrees Celsius.

53. The method of clause 48, wherein the HIO-incapable coating comprises a first set of elements forming volatile species with hydrogen plasma, the first set of elements being present in a concentration of less than 1%.

54. The method of clause 53, wherein the first set of elements includes one or more selected from: carbon, phosphorus, nitrogen, oxygen, silicon, germanium, tin, lead, fluorine, bromine, iodine, chlorine, or boron.

55. The method of clause 48, wherein the HIO-incapable coating comprises a second set of elements with a low sputtering threshold, the second set of elements being present in a concentration of less than 1%.

56. The method of clause 55, wherein the second set of elements includes one or more selected from: zinc, copper, magnesium, or aluminum.

57. The method of clause 48, wherein a portion of the inspection system proximate the environment of VUV optics is coated with the HIO-incapable coating, wherein the portion includes elements with a sputtering threshold higher than that of a reflective material of the one or more VUV mirrors or the protective coating of one or more of VUV mirrors.

58. The method of clause 1, wherein causing ionization of the hydrogen gas further includes heating a VUV mirror of the one or more VUV mirrors using an integrated thermal conditioning system to outgas gaseous products from the protective coating or a reflective material of the VUV mirror.

59. The method of clause 58, wherein heating the VUV mirror includes maintaining a temperature of the VUV mirror in a range of 25-200 degree Celsius.

60. The method of clause 58, wherein heating the VUV mirror further includes cooling the one or more VUV mirrors and their subsystems after cleaning sequence is completed.

61. The method of clause 1, wherein causing ionization of the hydrogen gas further includes operating an infra-red (IR) source in the inspection system to illuminate the one or more VUV mirrors, wherein the IR source agitates vibrational degrees of freedom of contaminants and outgases gaseous products.

62. The method of clause 61, wherein the gaseous products comprise one or more of water or methane.

63. The method of clause 61, wherein the IR source includes a flash lamp or a narrow band mid-IR laser.

64. The method of clause 1, further comprising performing a cleaning operation for cleaning the one or more VUV mirrors in a continuous mode or pulsed mode, wherein in the continuous mode the cleaning operation is performed simultaneously with a VUV operation for inspecting one or more substrates using VUV, and wherein in the pulsed mode, the cleaning operation is performed between two consecutive VUV operations.

65. The method of clause 64, wherein in the pulsed mode, the cleaning operation is performed after the VUV operation inspecting a single substrate or a batch of substrates.

66. The method of clause 64, wherein a composition of gas supplied for the cleaning operation is similar to a composition of gas provided near the VUV optics, due to mixing of plasma forming gas and gas supplied for the VUV operation.

67. The method of clause 64, wherein a composition of gas supplied for the cleaning operation is different from a composition of gas provided near the VUV optics, due to mixing of plasma forming gas and gas supplied for the VUV operation.

68. The method of clause 67, further comprising interrupting a gas supply for the VUV operation for the duration of the cleaning operation such that the plasma forming gas defines the composition of gas and pressure of gas near the VUV optics during the cleaning operation.

69. An inspection system, comprising:
vacuum ultraviolet (VUV) optics that is configured to guide VUV from a VUV source to a substrate in the inspection system, wherein the VUV optics includes one or more VUV mirrors that are coated with a protective coating comprising a noble metal; and
an ionizer configured to ionize or disassociate hydrogen gas supplied to an environment of VUV optics to generate hydrogen ions or radicals for cleaning the one or more VUV mirrors.

70. The inspection system of clause 69, further comprising a supply system to supply the hydrogen gas to the environment of VUV optics.

71. The inspection system of clause 69, wherein the noble metal is selected based on a solubility of the noble metal in a reflective material of the one or more VUV mirrors.

72. The inspection system of clause 71, wherein the noble metal having a lowest solubility in the reflective material is selected.

73. The inspection system of clause 71, wherein the reflective material comprises aluminum.

74. The inspection system of clause 71, wherein the noble metal is selected based on an absorption of VUV by the noble metal.

75. The inspection system of clause 74, wherein the noble metal having a lowest absorption for VUV is selected.

76. The inspection system of clause 69, wherein the noble metal includes one or more selected from: ruthenium, rhodium, silver, gold, iridium, osmium, or platinum.

77. The inspection system of clause 69, wherein the protective coating has a thickness of less than 3 nanometers.

78. The inspection system of clause 69, wherein the protective coating has a thickness of less than 10 nanometers.

79. The inspection system of clause 69, wherein the protective coating of the one or more VUV mirrors includes one or more elements in addition to the noble metal, wherein a concentration of each element of the one or more elements is less than 50% of composition of the protective coating.

80. The inspection system of clause 79, wherein a total concentration of the one or more elements is less than 50% of the composition of the protective coating.

81. The inspection system of clause 69, wherein the protective coating of the one or more VUV mirrors is adhered to a reflective material of the one or more VUV mirrors using an adhesion layer.

82. The inspection system of clause 81, wherein the adhesion layer prevents mixing of the noble metal with the reflective material.

83. The inspection system of clause 81, wherein the adhesion layer has a thickness of less than 3 nanometers.

84. The inspection system of clause 81, wherein the adhesion layer has a thickness of less than 10 nanometers.

85. The inspection system of clause 81, wherein the adhesion layer has a thickness lesser than that of the protective coating.

86. The inspection system of clause 69, wherein the hydrogen gas is supplied in a specified concentration, the specified concentration being dependent whether a VUV operation for inspecting one or more substrates is being performed or a cleaning operation for cleaning the one or more VUV mirrors is being performed.

87. The inspection system of clause 86, wherein the concentration of the hydrogen gas is in a range of 0 to 10% of a total concentration of all gases in the environment of VUV optics during the VUV operation.

88. The inspection system of clause 87, wherein the concentration of the hydrogen gas is less than 1% of a total concentration of all gases in the environment of VUV optics during the VUV operation.

89. The inspection system of clause 86, wherein the concentration of the hydrogen gas is in the range of 1-100% of a total concentration of all gases in the environment of VUV optics when the cleaning operating is being performed and the VUV operation is not being performed.

90. The inspection system of clause 69, wherein the ionizer includes a hydrogen radical generator (HRG), an electron beam-based ionizer, a plasma source-based ionizer, or laser-based ionizer.

91. The inspection system of clause 69, wherein the ionizer comprises an HRG having a filament, wherein the HRG is configured to achieve a filament temperature of over 1000 degrees Celsius to disassociate the hydrogen gas into the hydrogen radicals.

92. The inspection system of clause 91, wherein the filament is a tungsten filament.

93. The inspection system of clause 91, wherein a pressure of gases in the environment of VUV optics is maintained in a range of greater than 0.01 Pascal.

94. The inspection system of clause 91, wherein a pressure of gases in the environment of VUV optics is maintained in a range of 1 to 1000 Pascals.

95. The inspection system of clause 69, wherein the ionizer comprises plasma-based source, and wherein the ionizer is configured to output plasma in the environment of VUV optics with electron temperature of over 0.1 electron volts to ionize the hydrogen gas.

96. The inspection system of clause 95, wherein the electron temperature is maintained in a range of 1 to 10 electron volts.

97. The inspection system of clause 95, wherein a pressure of gases in the environment of VUV optics is maintained in a range of greater than 0.1 Pascal.

98. The inspection system of clause 95, wherein a pressure of gases in the environment of VUV optics is maintained in a range of 1 to 1000 Pascals.

99. The inspection system of clause 69, wherein the ionizer comprises an electron beam source that is configured to output an electron beam in the environment of VUV optics with an electron beam energy in a range of 10 volts to 10 kilo volts.

100. The inspection system of clause 99, wherein the electron beam energy is maintained in a range of 100 to 1000 volts.

101. The inspection system of clause 99, wherein a pressure of gases in the environment of VUV optics is maintained in a range of greater than 0.1 Pascal.

102. The inspection system of clause 99, wherein a pressure of gases in the environment of VUV optics is maintained in a range of 1 to 100 Pascal.

103. The inspection system of clause 99, wherein the one or more VUV mirrors are configured as electrodes to collect at least a portion of electron beam current or ion current.

104. The inspection system of clause 103, wherein the one or more VUV mirrors are biased positive to boost ionization or dissociation at the surface of the VUV optics or in vicinity of the VUV optics.

105. The inspection system of clause 104, wherein the one or more VUV mirrors are biased positive in a range of 1 to 100 volts.

106. The inspection system of clause 103, wherein the one or more VUV mirrors are biased negative to attract the hydrogen ions or boost their energy.

107. The inspection system of clause 106, wherein the one or more VUV mirrors are biased negative in a range of −1 to −100 volts.

108. The inspection system of clause 69, wherein the ionizer comprises a laser source that is configured to output a laser beam into the environment of VUV optics, wherein the laser beam causes a laser-induced discharge that ionizes the hydrogen gas or a mix of hydrogen gas with a noble gas.

109. The inspection system of clause 108, wherein a pressure of gases in the environment of VUV optics is maintained in a range of greater than 100 Pascals.

110. The inspection system of clause 108, wherein a pressure of gases in the environment of VUV optics is maintained in a range of 100,000 to 500,000 Pascals.

111. The inspection system of clause 108 further comprising one or more gate valves to maintain a pressure in the environment of VUV optics, wherein the one or more gate valves separate the environment of VUV optics from a first environment having a substrate to be inspected and a second environment having an illumination source of the inspection system.

112. The inspection system of clause 108, wherein the laser-induced discharge and the VUV optics are separated by a specified distance to avoid sputtering by the hydrogen ions or radicals.

113. The inspection system of clause 112, wherein the specified distance is greater than 1 millimeter.

114. The inspection system of clause 112, wherein the specified distance is greater than 10 millimeters.

115. The inspection system of clause 69 further comprising one or more interior walls proximate the environment of VUV optics, wherein the one or more interior walls comprise hydrogen-induced outgassing (HIO)-incapable coating.

116. The inspection system of clause 115, wherein the HIO-incapable coating includes one or more refractory metals.

117. The inspection system of clause 115, wherein the HIO-incapable coating includes one or more metals with boiling temperature of greater than 2500 degrees Celsius.

118. The inspection system of clause 115, wherein the VUV optics and a portion of the inspection system proximate the environment of VUV optics are coated with the HIO-incapable coating, wherein the portion includes elements with a sputtering threshold higher than that of a reflective material or the protective coating of the one or more VUV mirrors.

119. The inspection system of clause 69, wherein the one or more VUV mirrors further comprise a thermal conditioning system configured to heat the one or more VUV mirrors to outgas gaseous products from the protective coating or a reflective material of the one or more VUV mirrors.

120. The inspection system of clause 119, wherein the thermal conditioning system is configured to heat the one or more VUV mirrors to a temperature in a range of 20-200 degrees Celsius.

121. The inspection system of clause 119, wherein the thermal conditioning system is configured to cool the one or more VUV mirrors after cleaning of the one or more VUV mirrors.

122. The inspection system of clause 121, wherein the thermal conditioning system is configured to adjust the temperature of the one or more VUV mirrors after cleaning of the one or more VUV mirrors to a range of 20-50 degrees Celsius.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The descriptions above are intended to be illustrative, not limiting. Thus, it will be apparent to one skilled in the art that modifications may be made as described without departing from the scope of the claims set out below.

The invention claimed is:

1. A vacuum ultraviolet (VUV) mirror in an inspection system, the VUV mirror comprising:
    a reflective material of the VUV mirror, the reflective material comprising aluminum;
    a protective coating to protect the reflective material, wherein the protective coating contains a noble metal; and
    an adhesion layer that acts as an intermediate layer between the reflective material and the protective coating, the adhesion layer configured to adhere the protective coating to the reflective material and prevent mixing of the protective coating with aluminum, wherein the adhesion layer has a thickness of less than 10 nanometers and/or the adhesion layer has a thickness lesser than that of the protective coating.

2. The VUV mirror of claim 1, wherein the noble metal is selected based on a solubility of the noble metal in aluminum.

3. The VUV mirror of claim 1, wherein the noble metal is selected based on an absorption of VUV by the noble metal.

4. The VUV mirror of claim 1, wherein the noble metal includes one or more selected from: ruthenium, rhodium, silver, gold, iridium, osmium, or platinum.

5. The VUV mirror of claim 1, wherein the protective coating has a thickness of less than 3 nanometers.

6. The VUV mirror of claim 1, wherein the protective coating has a thickness of less than 10 nanometers.

7. The VUV mirror of claim 1, wherein the protective coating comprises one or more elements in addition to the noble metal, wherein a concentration of each element of the one or more elements is less than 50% of a composition of the protective coating.

8. The VUV mirror of claim 7, wherein a total concentration of the one or more elements is less than 50% of the composition of the protective coating.

9. The VUV mirror of claim 1, wherein the adhesion layer has a thickness of less than 3 nanometers.

10. The VUV mirror of claim 1, wherein the adhesion layer has a thickness of less than 10 nanometers.

11. The VUV mirror of claim 1, wherein the adhesion layer has a thickness lesser than that of the protective coating.

12. An inspection system, comprising:
    vacuum ultraviolet (VUV) optics that is configured to guide VUV from a VUV source to a substrate in the inspection system, wherein the VUV optics includes one or more VUV mirrors comprising a reflective material and a protective coating to protect the reflective material, the protective coating consisting of one or more noble metals or consisting of one or more noble metals and one or more other elements such that a total concentration of the one or more other elements is below 50% in the protective coating; and
    an ionizer configured to ionize or disassociate hydrogen gas supplied to an environment of VUV optics to generate hydrogen ions or radicals for cleaning the one or more VUV mirrors.

13. The inspection system of claim 12, wherein the reflective material comprises aluminum.

14. The inspection system of claim 12, wherein the noble metal includes one or more selected from: ruthenium, rhodium, silver, gold, iridium, osmium, or platinum.

15. The inspection system of claim 12, wherein the protective coating has a thickness of less than 10 nanometers.

16. The inspection system of claim 12, wherein the protective coating of the one or more VUV mirrors includes the one or more elements in addition to the noble metal, wherein a concentration of each element of the one or more elements is less than 50% of composition of the protective coating.

17. The inspection system of claim 12, wherein the protective coating of the one or more VUV mirrors is adhered to the reflective material of the one or more VUV mirrors using an adhesion layer.

18. The inspection system of claim 17, wherein the adhesion layer prevents mixing of the noble metal with the reflective material.

19. The inspection system of claim 17, wherein the adhesion layer has a thickness of less than 10 nanometers.

20. The inspection system of claim 17, wherein the adhesion layer has a thickness lesser than that of the protective coating.

* * * * *